US010891571B2

(12) United States Patent
Relangi

(10) Patent No.: US 10,891,571 B2
(45) Date of Patent: Jan. 12, 2021

(54) TASK MANAGEMENT PLATFORM

(71) Applicant: Capital One Services, LLC, McLean, VA (US)

(72) Inventor: Aditya Relangi, Irving, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/110,982

(22) Filed: Aug. 23, 2018

(65) Prior Publication Data
US 2020/0065736 A1 Feb. 27, 2020

(51) Int. Cl.
*G06Q 10/06* (2012.01)
*G08G 1/01* (2006.01)
*G06N 20/00* (2019.01)
*G06F 16/951* (2019.01)

(52) U.S. Cl.
CPC ..... *G06Q 10/06316* (2013.01); *G06F 16/951* (2019.01); *G06N 20/00* (2019.01); *G06Q 10/0633* (2013.01); *G06Q 10/0639* (2013.01); *G08G 1/0137* (2013.01)

(58) Field of Classification Search
None
See application file for complete search history.

(56) References Cited

U.S. PATENT DOCUMENTS

| 6,574,605 | B1 | 6/2003 | Sanders et al. |
| 7,062,449 | B1 | 6/2006 | Clark |
| 7,428,495 | B2 * | 9/2008 | Dhar ......................... A61J 9/00 |
| | | | 705/7.26 |
| 7,653,592 | B1 * | 1/2010 | Flaxman ................ G06Q 40/00 |
| | | | 705/35 |
| 7,849,044 | B2 | 11/2010 | Nelken |
| 8,229,962 | B1 * | 7/2012 | Cavalancia, II ............................ |
| | | | G06Q 10/06311 |
| | | | 707/791 |
| 2004/0199458 | A1 * | 10/2004 | Ho ......................... G06Q 40/02 |
| | | | 705/38 |
| 2006/0173724 | A1 | 8/2006 | Trefler et al. |
| 2008/0172282 | A1 * | 7/2008 | McNeill ................. G06Q 10/06 |
| | | | 705/7.18 |
| 2010/0088139 | A1 * | 4/2010 | Rahi ....................... G06Q 10/06 |
| | | | 705/7.36 |
| 2011/0282869 | A1 * | 11/2011 | Zhilyaev ............... G06F 16/957 |
| | | | 707/723 |

(Continued)

FOREIGN PATENT DOCUMENTS

WO WO 01/61552 A2 8/2001

*Primary Examiner* — Folashade Anderson
(74) *Attorney, Agent, or Firm* — Harrity & Harrity, LLP

(57) ABSTRACT

A device may receive, from a user device, a request for a recommendation identifying one or more tasks to be performed, of a set of tasks that are part of a job for an organization and associated with managing a set of applications for a product or a service. The device may generate the recommendation by using a data model that has been trained using one or more machine learning techniques to process data identifying a set of application status metrics based on application status data for the set of applications, and events data identifying real-time events associated with the group of sites. The device may provide the recommendation for display on an interface of the user device. The device may perform one or more actions associated with assisting in performance of at least one of the one or more tasks.

20 Claims, 10 Drawing Sheets

(56) References Cited

U.S. PATENT DOCUMENTS

| | | | |
|---|---|---|---|
| 2012/0029963 A1 | 2/2012 | Olding et al. | |
| 2012/0054088 A1* | 3/2012 | Edrington | G06Q 40/025 |
| | | | 705/38 |
| 2014/0074545 A1* | 3/2014 | Minder | G06Q 50/01 |
| | | | 705/7.27 |
| 2014/0136255 A1 | 5/2014 | Grabowski et al. | |
| 2015/0142489 A1* | 5/2015 | Block | H04W 4/029 |
| | | | 705/7.13 |
| 2016/0196524 A1* | 7/2016 | Ito | G06Q 10/063116 |
| | | | 705/7.14 |
| 2016/0300178 A1* | 10/2016 | Perry | G06Q 50/22 |
| 2017/0308841 A1 | 10/2017 | Swaminathan et al. | |
| 2018/0012170 A1* | 1/2018 | Roberts | G06F 16/24578 |
| 2018/0060796 A1* | 3/2018 | Stefik | G06Q 10/063116 |
| 2018/0121828 A1* | 5/2018 | Keysers | G06N 20/00 |
| 2018/0351987 A1* | 12/2018 | Patel | G06F 16/951 |
| 2019/0213509 A1* | 7/2019 | Burleson | G06Q 10/0633 |

\* cited by examiner

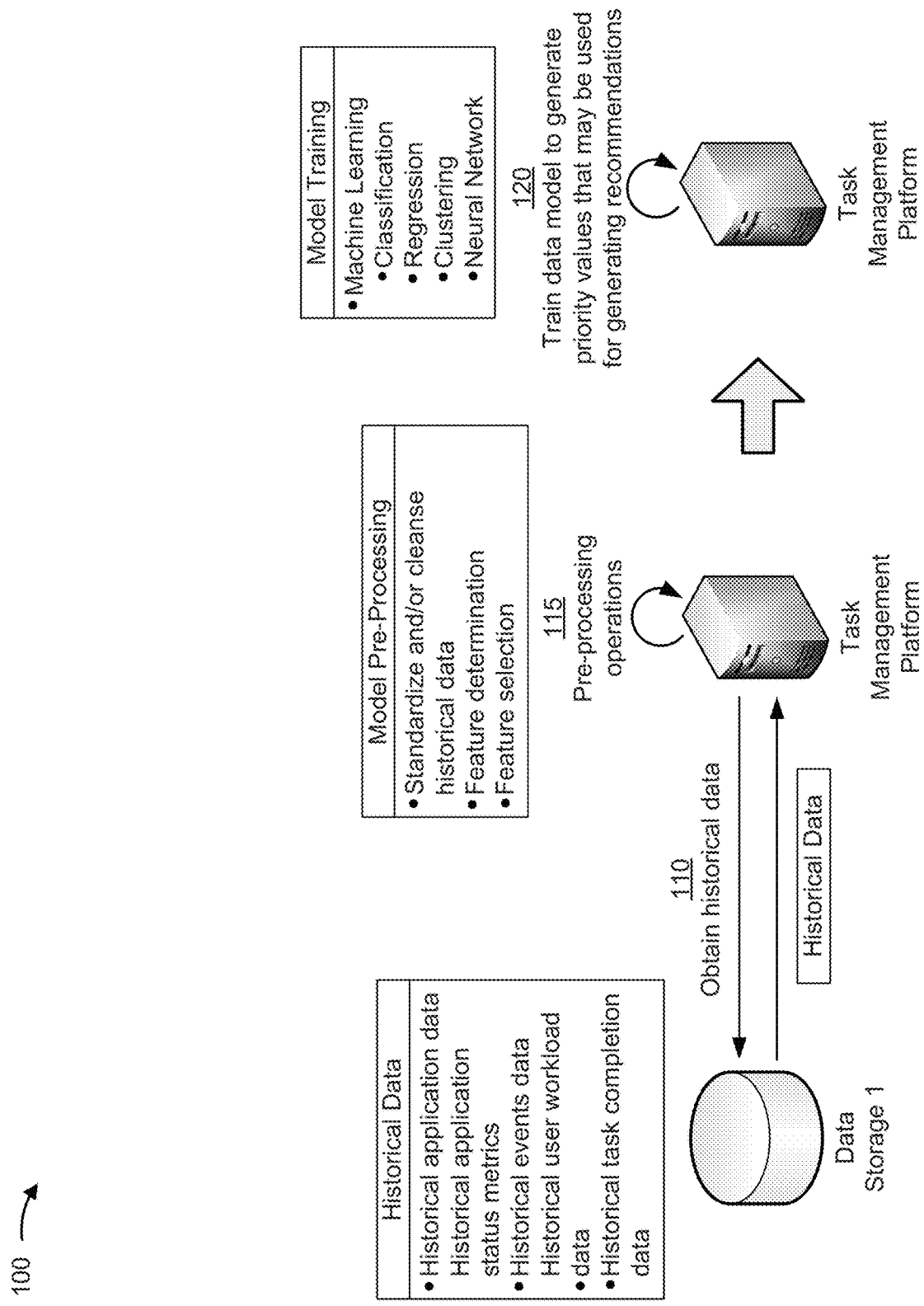

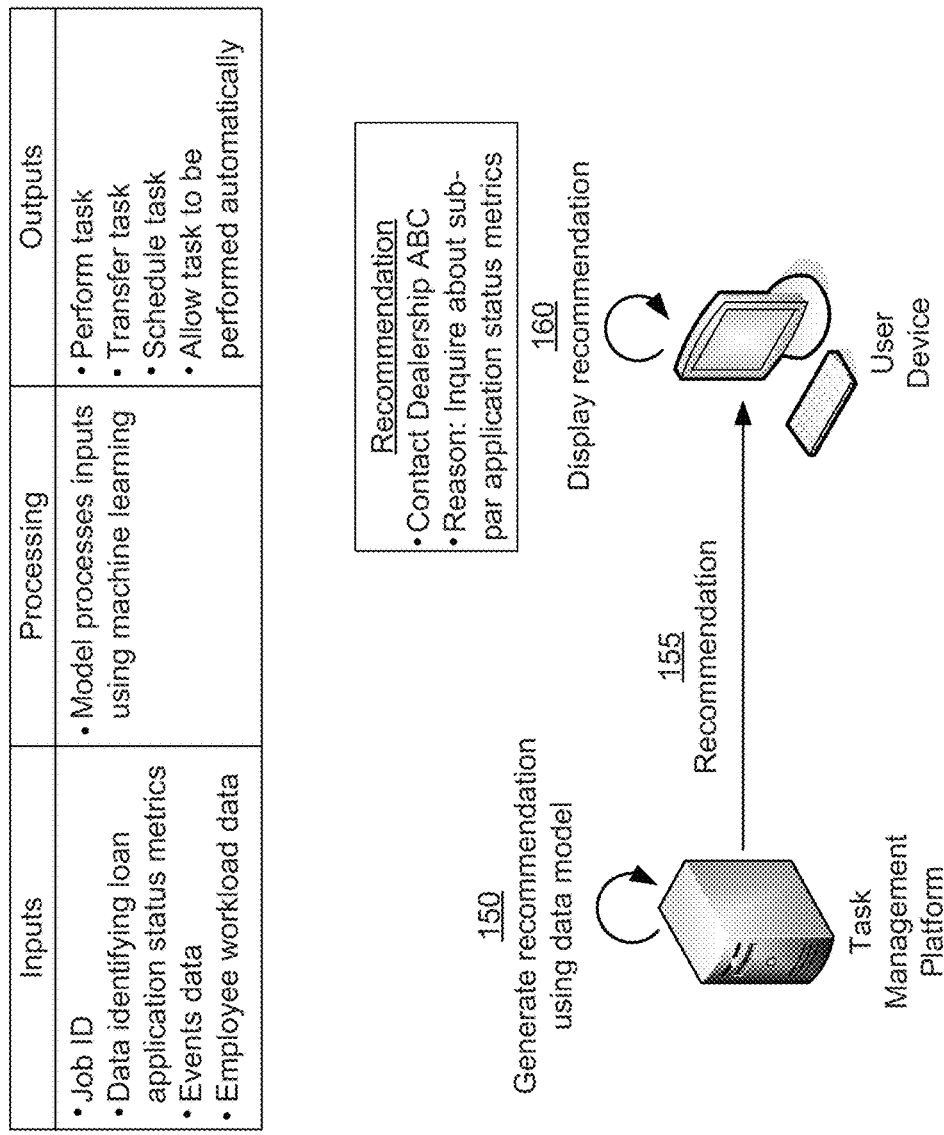

TASK MANAGEMENT PLATFORM

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some possible implementations, a device may include one or more memories, and one or more processors, communicatively coupled to the one or more memories, to receive, from a user device, a request for a recommendation identifying one or more tasks to be performed, of a set of tasks that are part of a job for an organization. The set of tasks may be associated with managing a set of applications for a product or a service. The one or more processors may obtain, after receiving the request, application status data for the set of applications. The one or more processors may generate, by processing the application status data, data identifying a set of application status metrics for a group of sites where prospective clients are able to submit particular applications. The one or more processors may obtain events data identifying real-time events associated with the group of sites. The events data may include at least one of: traffic data identifying traffic within the group of sites, or external events data identifying events that are external to the group of sites and that are likely to influence the traffic within the group of sites. The one or more processors may generate the recommendation identifying the one or more tasks to perform by using a data model that has been trained using one or more machine learning techniques to process the data identifying the set of application status metrics and the events data. The one or more processors may provide the recommendation for display on an interface of the user device. The one or more processors may perform, after providing the recommendation to the user device, one or more actions associated with assisting in performance of at least one of the one or more tasks.

According to some possible implementations, a method may include receiving, by a device and from a user device, a request for a recommendation identifying a task to be performed. The task may be part of a set of tasks that are to be performed as part of a job to manage a set of applications for a product or a service. The method may include obtaining, by the device and after receiving the request, data identifying a set of application status metrics for a group of sites where prospective borrowers are able to submit particular applications. The method may include obtaining, by the device, events data identifying real-time events associated with the group of sites. The events data may include at least one of: internal events data identifying events within the group of sites, or external events data identifying events that are external to the group of sites and that are likely to influence the events within the group of sites. The method may include generating, by the device, a set of priority values for the set of tasks by processing the data identifying the set of application status metrics and the events data using a data model that has been trained using one or more machine learning techniques. The method may include generating, by the device, the recommendation to perform the task based on the set of priority values for the set of tasks. The method may include providing, by the device, the recommendation to the user device to allow the task to be performed. The method may include performing, by the device and after generating the recommendation, one or more actions associated with assisting in performance of the task.

According to some possible implementations, a non-transitory computer-readable medium may store instructions that include one or more instructions that, when executed by one or more processors of a device, cause the one or more processors to receive, from a user device, a request for a recommendation identifying a task that is part of a set of tasks and that are part of a job for managing a set of applications for a product or a service. The one or more instructions may cause the one or more processors to receive data identifying a set of application status metrics for a group of sites where prospective borrowers are able to submit particular applications. The one or more instructions may cause the one or more processors to obtain events data identifying real-time events associated with the group of sites. The one or more instructions may cause the one or more processors to generate a set of priority values for the set of tasks by processing the data identifying the set of application status metrics and the events data using a data model that has been trained using one or more machine learning techniques. The one or more instructions may cause the one or more processors to generate the recommendation to perform the task by selecting the task associated with a highest-available priority value. The one or more instructions may cause the one or more processors to provide the recommendation for display on an interface of the user device. The one or more instructions may cause the one or more processors to perform, after generating the recommendation, one or more actions associated with assisting in performance of the task.

BRIEF DESCRIPTION OF THE DRAWINGS

FIGS. 1A-1E are diagrams of an example implementation described herein.

DETAILED DESCRIPTION

Figure 1A:
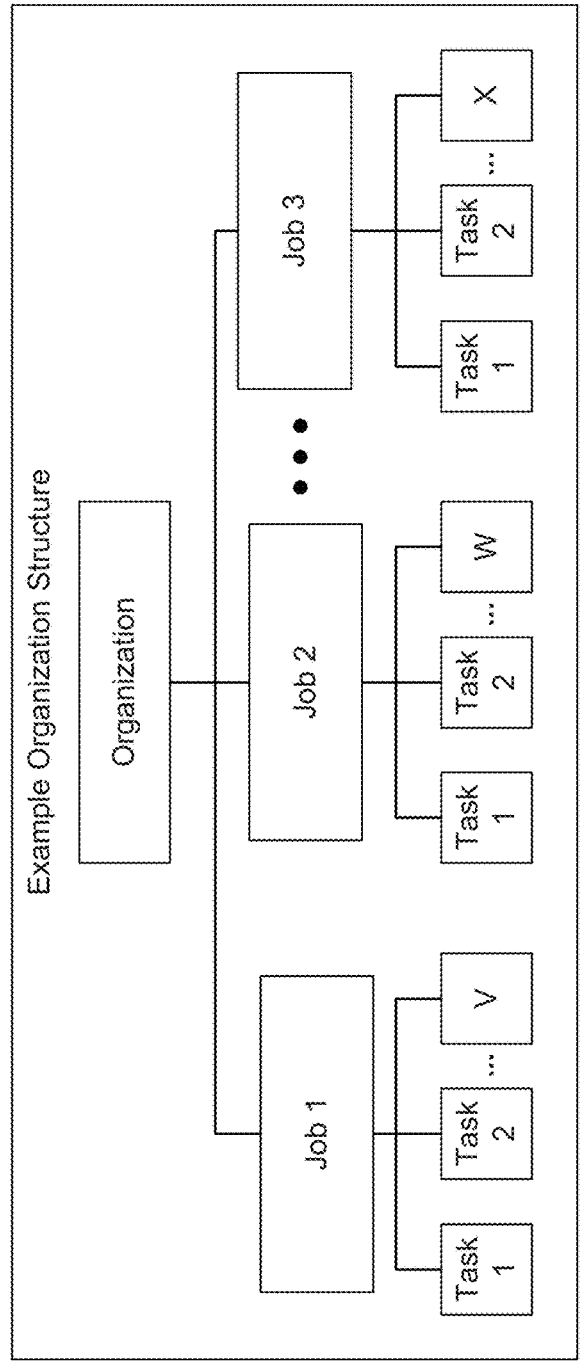

The following detailed description of example implementations refers to the accompanying drawings. The same reference numbers in different drawings may identify the same or similar elements.

An organization may use a scheduling system to assign employees to particular work schedules, to route incoming calls (e.g., to customer service representatives within a call center), to assign tasks to be performed as part of particular jobs within the organization, and/or the like.

However, when assigning tasks to be performed as part of a job within the organization, the scheduling system may be unable to identify an optimal order in which to complete the tasks when completion of the tasks is influenced by real-time events. For example, a job within an organization may include tasks that require contacting prospective clients, existing clients, other employees within the organization, and/or the like. In this case, the scheduling system may be unable to identify an optimal order in which to recommend completing the tasks because real-time events may influence the availability of the individuals that need to be contacted.

Failing to identify an optimal order in which to complete tasks causes the organization to waste a considerable amount of resources, such as processing resources of devices used to call individuals who are unavailable, network resources of networks used to make the calls to the individuals who are unavailable, human resources of an agent of the organization that is making the calls, and/or the like. Additional network resources may be expended if individuals return the calls, only to discover that the agent is no longer available.

To provide an example, a task may require contacting a vendor site to improve relationships with a vendor organization. Whether an agent of the organization is able to successfully connect with an employee at the vendor site may depend on whether the employee is available to take a call. This availability may vary based on a number of real-time events, such as whether the vendor site is fully staffed (e.g., an employee may call in sick), an amount of foot traffic within the vendor site (e.g., employees may be unavailable for a call during peak shopping hours), weather near the vendor site (e.g., which may influence foot traffic), a sale occurring at the vendor site that may cause an influx of foot traffic, and/or the like. Without knowledge of the real-time events occurring at the vendor site that needs to be contacted, the organization may continue to expend processing resources, network resources, and/or human resources on unsuccessful attempts to complete the task.

Some implementations described herein include a task management platform to use machine learning to intelligently generate recommendations that optimize completion and/or performance of a set of tasks, whereby completion of the set of tasks may be influenced by real-time events. For example, the task management platform may receive, from a user device, a request for a recommendation to identify a task to perform for a job within an organization. The job may include performing a set of tasks relating to managing applications of individuals that are applying for a loan, a job, a type of insurance, and/or the like.

In some implementations, the job may be a relationship manager of a loan provider. The relationship manager may be assigned a set of tasks that include managing applications of a group of individuals that are applying for loans, contacting employees within the organization to inquire about a status of the applications, contacting vendor sites of one or more vendor organizations who are authorized to submit applications for loans on behalf of prospective clients, and/or the like. A vendor organization may offer a product (e.g., a vehicle, a home, and/or the like) that may be purchased with a loan offered by the organization. As such, the relationship manager may authorize dealers at vendor sites to offer prospective clients loans at particular annual percentage rates (APRs). Additionally, or alternatively, the relationship manager may be tasked with contacting employees at these vendor sites to perform customer service calls, sales calls, calls to further relationships with the dealers at the vendor sites, and/or the like.

In some implementations, the task management platform may obtain data that may be used to generate the recommendation. For example, the task management platform may obtain data identifying a set of application status metrics for the set of applications, events data identifying real-time events occurring at a group of vendor sites (e.g., which may need to be contacted by the user submitting the request), user workload data identifying a workload capacity for a group of users that perform the job for the organization (e.g., a team of relationship managers may collectively contact all vendor sites associated with vendor organizations that conduct business with the organization), and/or the like.

In some implementations, the task management platform may generate the recommendation identifying the task to perform. For example, the task management platform may provide the obtained data as input to a data model that has been trained using one or more machine learning techniques, which may cause the data model to output a set of priority values for the set of tasks. The set of priority values may be based on a degree of importance in performing particular tasks (e.g., which may be based on application status metrics), a likelihood of real-time events delaying performance of particular tasks, availability of other users capable of performing particular tasks, and/or the like. Additionally, the task management platform may process the set of priority values to select a task with a highest-available priority value and may provide a recommendation to the user device to perform the task with the highest-available priority value. In some implementations, the task management platform may perform one or more actions associated with assisting in performance of the task (e.g., automatically initiating a call to a particular vendor site, preparing custom tools to assist with performance of the task, and/or the like), as described further herein.

In this way, the task management platform generates a recommendation that considers a degree of importance in performing particular tasks, a likelihood of performance of particular tasks being influenced by real-time events, availability of other users with the same or similar jobs who may be available to assist in performance of particular tasks, and/or the like. This conserves processing resources and/or network resources relative to an inferior platform that might otherwise expend resources generating recommendations for sub-optimal tasks (e.g., tasks that are not capable of being completed on a first attempt due to influence from a real-time event), conserves processing resources and/or network resources of devices used to attempt to complete the sub-optimal tasks, and/or the like.

Furthermore, several different stages of the process for generating the recommendation are automated, which may remove human subjectivity and waste from the process, and which may improve speed and efficiency of the process and conserve computing resources (e.g., processor resources, memory resources, and/or the like). Additionally, implementations described herein use a rigorous, computerized process to perform tasks or roles that were not previously performed or were previously performed using subjective human intuition or input. For example, the task management platform may intelligently identify and/or generate custom tools that may be used to assist users in performing tasks, such as by identifying contact information of an individual that needs to be contacted, identifying application status metrics that may be relevant when contacting the individual, generating templated scripts that are tailored to individual or vendor organization being contacted, and/or the like.

FIGS. 1A-1E are diagrams of an overview of an example implementation 100 described herein. For example, example implementation 100 may include a task management system, a first data storage element (shown as Data Storage 1), a user device, a second data storage element (shown as Data Storage 2), a third data storage element (shown as Data Storage 3), a group of data storage elements (shown as Data Storage 4 through Data Storage N), a vendor device, and a mobile device to be used to automatically perform a particular task.

As shown in FIG. 1A, and by reference number 105, an organization may use the task management system to manage tasks of one or more jobs within the organization. For example, the task management system may include a task management platform that uses machine learning to intelligently recommend tasks for users to perform, as described further herein.

In some implementations, a job within the organization may include a set of tasks. For example, if the job is a relationship manager of a loan provider, the job may include a set of tasks relating to managing a set of applications of individuals that are applying for loans. The set of tasks may include a task to contact another department within the organization (e.g., to look into an issue relating to a loan), a task to contact a vendor site that is authorized to offer loan applications to individuals who may want a loan for purchasing a product offered by a vendor organization (e.g., a vehicle, a house, and/or the like), a task to investigate a status or a performance metric of an application or a set of applications that are linked to a particular vendor site, and/or the like.

In this case, completion of the set of tasks may be influenced by a number of different real-time events. For example, a task to call a vendor site may be influenced by events affecting whether employees at the vendor site are available for the call, such as whether the vendor site is fully staffed (e.g., an employee may call in sick, be on a lunch break, and/or the like), an amount of foot traffic within the vendor site (e.g., employees may be unavailable for a call during peak shopping hours), weather near the vendor site (e.g., which may influence foot traffic), a sale occurring at the vendor site that may cause an influx in foot traffic, and/or the like. Similar real-time events may influence whether the user is able to contact a user working in another department within the organization. For example, a separate department may handle declined applications and/or disbursal of funds, and availability of employees that handle these tasks may be influenced by similar real-time events described above.

It is to be understood that the job and/or the set of tasks described herein are provided by way of example. In practice, the task management system may recommend tasks that may be performed as part of any number of different types of jobs for any number of different types of organizations. To provide another example, the task management system might generate a recommendation for a direct sales job within an organization. In this example, the direct sales job may involve making sales calls to prospective client sites, performing follow-up calls with client sites of existing clients, and/or the like. As such, the task management platform may be able to intelligently generate a recommendation identifying an optimal task to perform by considering one or more real-time events occurring at the prospective client sites and/or the client sites.

In this way, the organization is able to use the task management system to manage tasks of one or more jobs within the organization.

As shown in FIG. 1B, the task management platform may train a data model. For example, to be able to recommend performing a task (e.g., over other tasks), the task management platform may train the data model by using one or more machine learning techniques to process historical data, such that the data model is able to score (e.g., rank) a set of tasks. The set of tasks may be scored based on a degree of importance in completing a particular task (e.g., before other tasks), based on a likelihood of particular tasks being performed without delay, based on whether a task assigned to a particular user is capable of being performed by another employee who is available to perform the task, and/or the like.

While one or more implementations described herein describe a method for generating recommended tasks relating to managing a set of applications for loans, it is to be understood that this is provided by way of example. In practice, one or more implementations described herein may be applied to any other set of tasks that involve actions that may be influenced by real-time events, such other tasks that involve making calls (e.g., sales calls, custom service calls, and/or the like), tasks that involve managing other types of applications (e.g., applications for a job, applications for a type of insurance, and/or the like), tasks associated with procurement of goods and/or services, task associated with delivery and/or shipment of goods and/or services, and/or the like.

As shown by reference number 110, the task management platform may obtain the historical data. For example, the task management platform may obtain the historical data by providing a request for the historical data to the first data storage element, which may cause the first data storage element to provide the historical data to the task management platform. The historical data may include data identifying applications that were managed as part of the job within the organization, data identifying historical application status metrics for the applications, historical events data identifying time stamped events that occurred at a group of sites (e.g., vendor sites that requested loans on behalf of prospective clients of the organization, organization sites supporting other employees that interact with loan applications, and/or the like), historical user workload data identifying a workload capacity for a group of users that are performing the job for the organization, historical task completion data (e.g., of users of the organization who completed various tasks), and/or the like.

The historical application data may include data relating to particular applications, such as data identifying a status of an application at particular time periods, data identifying whether the application was approved, data identifying a total time until the application was approved, data identifying a number of times the application was rejected until being approved, and/or the like.

The historical application status metrics may include metrics relating to the group of vendor sites that are authorized to offer loan applications to prospective individuals, such as a metric identifying a total number of applications requested by a vendor site (e.g., over a particular time period), a metric identifying an average number of applications requested by the vendor site (e.g., over the particular time period), an average APR offered in applications at the vendor site (e.g., over the particular time period), a metric identifying a number of approved applications that were referred via the vendor site (e.g., over the particular time period), a metric identifying an average application cycle time for approved applications that were referred via the vendor site (e.g., over the particular time period), and/or the like.

The historical events data may include data identifying time stamped events that occurred at the group of vendor sites. For example, the historical events data may include internal events data identifying events within the group of vendor sites (e.g., foot traffic within a vendor site, a sale for customers that visit the vendor site, and/or the like), external events data identifying events that are external to the group of vendor sites and that are likely to influence the traffic within the group of vendor sites (e.g., vehicle traffic outside of a vendor site, weather near a vendor site, a holiday, and/or the like), and/or the like. Additionally, or alternatively, the historical events data may include similar data identifying time stamped events that occurred at the group of organization sites (e.g., data identifying internal events at an organization site, data identifying external events at or near the organization site, and/or the like).

The historical user workload data may include data identifying, for a particular time period, a workload capacity for a group of users that are performing the job for the organization, and may include work schedule data identifying a number of tasks allocated to a worker's schedule (e.g., at particular time periods), worker deadline data identifying when a particular worker missed a task completion deadline, worker downtime data identifying time periods where a worker is not engaging in completion of a particular task, and/or the like. The historical task completion data may include data identifying a task that was completed by a user of the organization, data identifying a time the task was completed, data identifying whether the task was completed on a first attempt, and/or the like.

As shown by reference number 115, the task management platform may perform one or more pre-processing operations needed to train the data model. For example, the task management platform may standardize and/or cleanse the historical data, determine features capable of being used to train the data model, select features for training the data model, and/or the like, as further described herein.

In some implementations, the task management platform may standardize and/or cleanse the historical data. For example, the task management platform may perform a data preprocessing operation to transform the historical data into a format that is capable of being used in the data model. As an example, the task management platform may remove non-ASCII characters, white spaces, confidential data (e.g., relating to personal information of users), and/or the like. Furthermore, the task management platform may standardize and/or cleanse thousands, millions, billions, or more, of data points for machine learning and model generation—a data set that cannot be processed objectively by a human actor.

In some implementations, the task management platform may identify and/or generate a set of features that are capable of being used to train the data model. The set of features may include features identifying particular historical data values, features identifying aggregated historical data values, features identifying averages of historical data values, features identifying trends associated with historical data values, features identifying benchmarks associated with the historical data values, and/or the like. The set of features may serve as indicators of a degree of importance in completing a particular task (e.g., before other tasks), a likelihood of the particular task being performed without delay, whether the particular task is capable of being performed by other users who are available to perform the task, and/or the like.

As an example, an application status value indicating that an application has been delayed for a threshold time period may serve as an indicator that it would be important to perform a task to call to investigate why the application is being delayed. As another example, an application status metric value indicating that a vendor site submits, on average, 50 applications per month, but has only submitted 1 application at a halfway point of the month, may serve as an indicator that it would be important to perform a task to call the vendor site to investigate why a low number of loan applications have been submitted.

As another example, a threshold amount of traffic (e.g., foot traffic, vehicle traffic, etc.) at a site (e.g., a vendor site) may serve as an indicator that a task to call the site is likely (or unlikely) to be performed without delay. In this example, the task management platform may obtain foot traffic data and/or vehicle traffic data using a crowdsourcing technique, as described further herein. As another example, a certain type of weather may influence the traffic at the site and may serve as an indicator that the task to call the site is likely (or unlikely) to be performed without delay.

As another example, at a particular time period, a user of the organization may have a threshold amount of capacity to take on additional work which may serve as indicator that the user is more (or less) likely to be available to assist other users with other tasks. As another example, a trend may identify that a certain site (vendor site, organization site, and/or the like), certain user (e.g., employee of the organization, employee of a vendor organization at a vendor site, and/or the like), and/or the like, may be more (or less) available at a particular time period.

In some implementations, the task management platform may obtain a set of features by providing the historical data to one or more user devices, such as user devices associated with subject matter experts that are able to analyze the historical data. In this case, the one or more subject matter experts may identify the set of features and may provide data identifying the set of features back to the task management platform for further processing.

In some implementations, the task management platform may determine the set of features using a feature determination technique. For example, the task management platform may generate the set of features using a trend variable analysis, a neural network, a composite indicators analysis, a clustering analysis, and/or the like.

As an example, the task management platform may determine the set of features by performing a trend variable analysis. For example, the task management platform may perform a trend variable analysis to determine features associated with changes to historical data values over time. In this case, the task management platform may aggregate historical data values periodically over a particular time period and may compare the aggregated historical data values to identify changes in the aggregated historical data values throughout the particular time period. As a specific example, the task management platform may use the trend variable analysis to determine features relating to trends that occurred when a set number of historical data values were present, such as a trend indicating that a task to call an employee at a vendor site was never performed on a first attempt when the vendor site had a threshold amount of foot traffic.

As another example, the task management platform may determine features using a neural network. For example, the task management platform may use a neural network to determine a large quantity of features (often referred to as feature explosion). In this case, the task management platform may perform a principal component analysis (PCA) to reduce and combine a large set of features into an aggregated and/or reduced set of features. Additionally, the task management platform may perform multiple iterations of determining the large quantity of features and PCA until a final set of features is determined.

As another example, the task management platform may determine features using a composite indicators analysis. For example, the task management platform may analyze historical data to determine a likelihood of a task being performed without delay (e.g., on a first attempt). In this example, the task management platform may determine that a task to call an employee at a vendor site has an 80% chance of being performed if the vendor site has a low amount of foot traffic and if there is a heavy amount of precipitation near the vendor site. Similarly, the task management platform may determine that this percentage drops to 30% if the vendor site has a high amount of foot traffic and if there is no precipitation or snow near the vendor site.

In some implementations, the task management platform may perform a training operation when generating the data model. For example, the task management platform may portion the historical data into a training set, a validation set, a test set, and/or the like. In some implementations, the task management platform may train the data model using, for example, an unsupervised training procedure and based on the training set of the historical data. In this case, the task management platform may use a feature selection technique, such as dimensionality reduction, to reduce the historical data and/or the set of features identified above into a minimum feature set. This allows the task management platform to conserve processing resources relative to training the data model using all of the historical data and/or the entire set of features.

In some implementations, the task management platform may use one or more feature selection techniques to determine a minimum feature set that reduces overfitting and/or sparsity within the historical data. Overfitting may occur when a model performs an analysis that is too particular or too contextualized to training data used to train the model. Sparsity may occur in the data model when data is obtained from a large set of data sources that store data at different levels of granularity, which may lead to a large number of features that are unavailable to be used as indicators of a degree of importance of performing a task (e.g., relative to other tasks), of performing the task without delay (e.g., on a first attempt), and/or the like.

As an example, if half of the vendor sites are located inside of large shopping malls, vehicle traffic may not be a clear indicator of how busy employees are within the vendor site (e.g., the mall may be busy because shoppers are visiting other stores). As another example, if half of the vendor sites are outdoors and half of the vendor sites are indoors, the historical weather data may not be a reliable indicator of how busy employees are within the vendor sites (e.g., unless the weather data is processed in conjunction with additional information, such as whether a vendor site is indoor or outdoor).

In some implementations, the task management platform may select generalized features to reduce sparsity and/or overfitting. For example, the task management platform may select generalizable features to reduce sparsity by performing a variable selection using random forest (VSURF) analysis, a bootstrapping analysis, and/or the like.

Additionally, or alternatively, the task management platform may select one or more subsets of features for training the data model in a way that reduces overfitting of data. For example, the task management platform may reduce overfitting of data by performing a regularization (e.g., L1, L2, etc.) analysis. In this case, the task management platform may add a regularization term into a set loss function and may execute a minimization technique to identify a model that satisfies a threshold level of simplicity. In this way, the task management platform conserves processing resources that might otherwise be expended by processing live data using a data model that outputs inaccurate values as a result of over-contextualized features.

Additionally, or alternatively, the task management platform may select one or more subsets of features that provide contextualized information. For example, the task management platform may identify a set of historical data values that include a threshold amount of non-null values and may select a subset of contextualized features to apply to the historical data values that include the threshold amount of non-null values. In this way, the task management platform conserves processing resources that might otherwise be expended by processing live data using a data model that outputs inaccurate values as a result of over-generalized features.

As shown by reference number 120, in some implementations, the task management platform may train the data model using one or more machine learning techniques. For example, the task management platform may train the data model by using one or more machine learning techniques to process the set of features or the subset of the features to score tasks identified in the historical data. The one or more machine learning techniques may include a supervised machine learning technique (e.g., a classification-based technique, a technique using regression, and/or the like), a clustering technique, an anomaly detection technique, a neural network or similar type of learning network, and/or the like.

In some implementations, the task management platform may use a logistic regression classification technique to determine a categorical outcome. For example, the task management platform may use a logistic regression classification technique to determine a degree of importance of performing a task, a likelihood of the task being performed without delay (e.g., on a first attempt, within a threshold number of attempts, and/or the like), whether a task assigned to a particular user is capable of being performed by another employee who is available to perform the task, and/or the like. Additionally, or alternatively, the task management platform may determine a categorical outcome using linear regression or another type of regression.

Additionally, or alternatively, the task management platform may use a naïve Bayesian classifier technique. In this case, the task management platform may perform binary recursive partitioning to split a minimum feature set into partitions and/or branches, and may use the partitions and/or the branches to perform predictions (e.g., whether a task is able to be performed without delay, whether a task may be performed by an employee other than an employee that was assigned the task, and/or the like). Based on using the recursive partitioning, the task management platform may reduce utilization of computing resources relative to manual, linear sorting and analysis of data points, thereby enabling use of thousands, millions, billions, or more, of data points to train the data model, which may result in a more accurate data model than using few data points.

Additionally, or alternatively, the task management platform may use a support vector machine (SVM) classifier technique to generate a non-linear boundary between data points in the training set. In this case, the non-linear boundary is used to classify test data (e.g., data identifying a particular feature or group of features) into a particular class (e.g., a class may be used when ranking a set of tasks, by associating classes with likelihoods of the task being able to be performed without delay, in a threshold time period, and/or the like).

Additionally, or alternatively, the task management platform may train the data model using a supervised training procedure. For example, the supervised training procedure may include receiving input to the data model from a subject matter expert, which may reduce an amount of time, an amount of processing resources, and/or the like, to train the data model relative to an unsupervised training procedure.

In some implementations, the task management platform may train the data model using one or more weights. For example, particular features may serve as indicators of a degree of importance in performing a task, indicators of whether a task may be performed without delay, and/or the like. In this case, the task management platform may assign weighted values to the particular features and may use the weighted values when scoring the set of tasks.

In some implementations, a separate device (e.g., a desktop computer, a laptop computer, and/or the like) may train the data model. In this case, the separate device may provide the trained predictive data model to the task management platform. In some implementations, the task management platform may train multiple data models. For example, the task management platform may train different data models for different jobs within the organization, different data models for different types of tasks, different data models for different subsets of features, and/or the like.

In this way, the task management platform trains a data model to score (e.g., rank) data in a manner that may be used to generate a recommended task or group or tasks to perform.

Figure 1C:
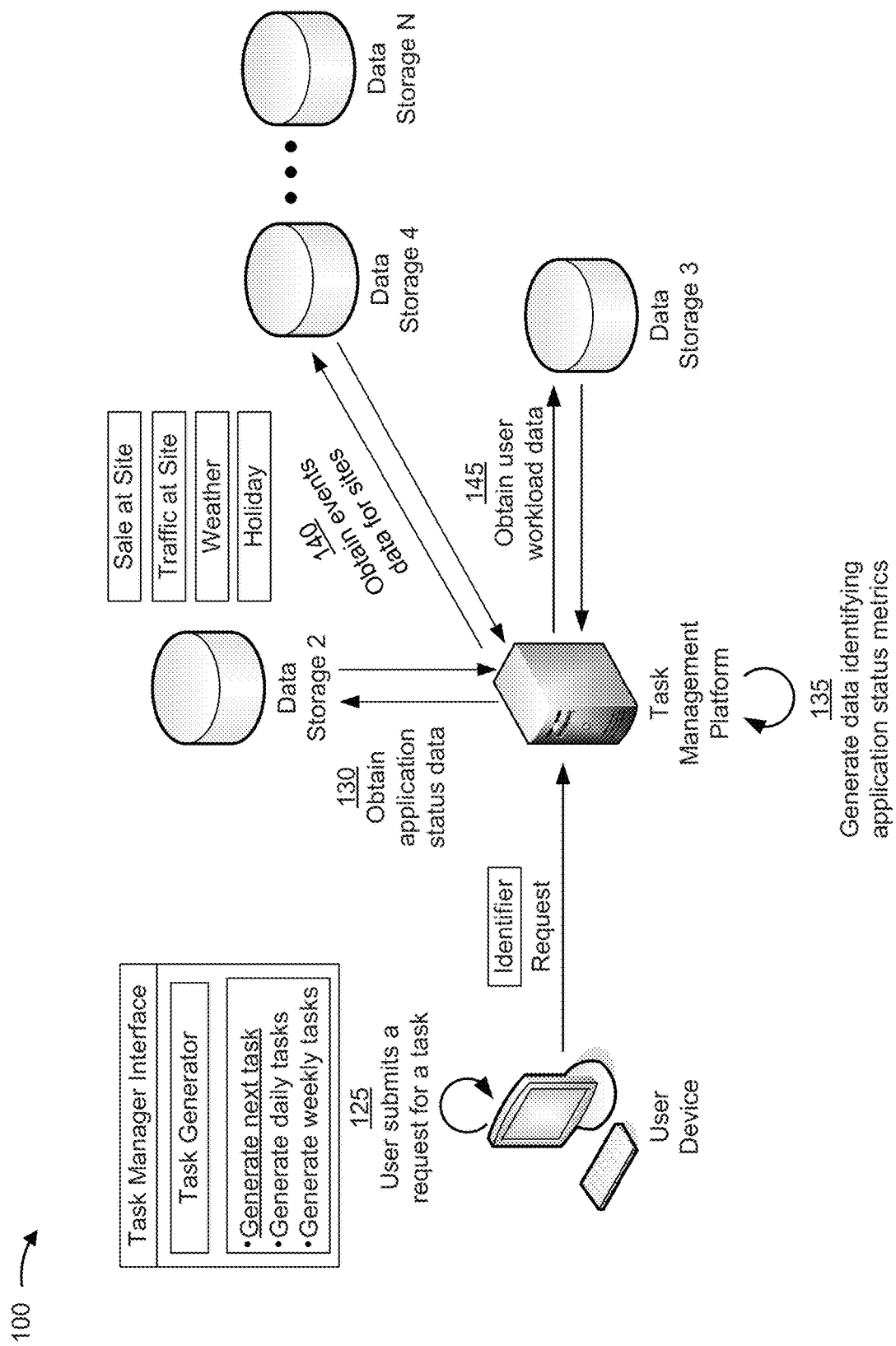

As shown in FIG. 1C, and by reference number 125, a user (e.g., a relationship manager of a loan provider) may interact with an interface of the user device to submit a request for a task. For example, the user interface may display a task generator, which may include one or more selectable task settings indicating that the task generator may be used to select a next task (e.g., to be completed immediately), a list of daily tasks, a list of weekly tasks, and/or the like. In some cases, the user may adjust other task-related settings, such as whether tasks are permitted to be transferred to other users within the organization, whether tasks are permitted to be transferred to the user from the other users within the organization, and/or the like.

When the user device submits the request, the request may be sent to the task management platform for further processing. In some cases, the request may include an identifier that may be used to identify tasks for a particular job, for a particular user, for a particular user device, for a particular organization, and/or the like.

As shown by reference number 130, the task management platform may obtain application status data from the second data storage element. For example, the task management platform may, based on receiving the request, use a search query to obtain application status data for a set of applications that are to be managed as part of the job within the organization. The application status data may include data identifying an application, data identifying a subject of the application, data identifying a status of an application (e.g., application received and awaiting background check, application missing information, application approved, and/or the like), data identifying specific information within the application (e.g., if the application is a loan application, an interest rate associated with a loan), data identifying a vendor site at which the application was requested, and/or the like.

As shown by reference number 135, the task management platform may generate data identifying application status metrics for the set of applications. For example, the task management platform may process the application status data to generate data identifying application status metrics associated with the set of applications. The application status metrics may include the same or similar metrics as defined above with respect to historical application status metrics.

In some implementations, the task management platform may generate application status metrics for the group of vendor sites. For example, the task management platform may generate, for a vendor site, a metric identifying a total number of applications requested by the vendor site (e.g., over a particular time period), a metric identifying an average number of applications requested by the vendor site (e.g., over the particular time period), a metric identifying an average APR offered in applications at the vendor site (e.g., over the particular time period), a metric identifying a number of approved applications that were referred via the vendor site (e.g., over the particular time period), a metric identifying an average application cycle time for approved applications that were referred via the vendor site (e.g., over the particular time period), and/or the like. Additionally, or alternatively, the task management platform may generate application status metrics as between different vendor organizations, different subsets of vendor sites within a vendor organization (e.g., based on geographic region, etc.), and/or the like.

In some implementations, the task management platform may obtain the data identifying the application status metrics from the second data storage element. For example, rather than process the application status data to generate the data identifying the application status metrics, the task management platform may obtain the data identifying the application status metrics in a manner similar to that described above.

As shown by reference number 140, the task management platform may obtain events data from the group of data storage elements. For example, the task management platform may obtain events data identifying real-time events occurring at the group of vendor sites (e.g., real-time relative to the data being captured and transmitted to the task management platform). The events data may include internal events data identifying events within the group of vendor sites, such as foot traffic within a vendor site, vendor promotions being offered within the vendor site, and/or the like. Additionally, or alternatively, the events data may include external events data identifying events that are external to the group of vendor sites but that may influence the sales and/or foot traffic within the group of vendor sites (e.g., vehicle traffic outside of a vendor site, weather near a vendor site, a holiday, and/or the like), and/or the like.

In some implementations, the task management platform may obtain foot traffic data associated with a vendor site. For example, a particular organization may specialize in providing foot traffic data at various geographic locations. In this case, the task management platform may, using an application programming interface (API), provide a request for the foot traffic data associated with the vendor site by submitting a request that includes an identifier for the vendor site (e.g., a vendor site name, address, etc.), an identifier of a mall associated with the vendor site, a group of geographic coordinates that define an area associated with the vendor site, and/or the like. This may cause a server device of the particular organization to provide the task management platform with the foot traffic data.

Additionally, or alternatively, the task management platform may obtain foot traffic data associated with the vendor site using a crowdsourcing technique. For example, anonymized and aggregated visits to the vendor site may be tracked using mobile devices of individuals who visit the vendor site (e.g., and who have opted-in to allow location-tracking). In this case, the task management platform may reference a data storage device that stores the anonymized and aggregated foot traffic data of the individuals who are presently visiting the vendor site. Furthermore, it is to be understood that one or more implementations described herein that rely on location information of mobile devices are to be performed only after individuals have opted-in to permit tracking of the location information.

Additionally, or alternatively, the task management platform may obtain data identifying vendor promotions being offered within the vendor site. For example, the vendor organization may advertise promotions (e.g., via a webpage, via e-mails, and/or the like), and the task management platform may obtain the advertised promotions (e.g., by scrapping a website of the vendor organization, etc.), and may process the advertised promotions to identify a vendor site that is subject to the promotions, a type of promotion, a sale amount used for the promotion, and/or the like.

Additionally, or alternatively, the task management platform may obtain weather data associated with the vendor site. For example, an organization may provide real-time weather updates (e.g., via a webpage), and the task management platform may use an API to request the weather data associated with the vendor site. Additionally, or alternatively, the task management platform may obtain weather data from a sensor device. For example, a sensor device may be positioned outside of the vendor site. In this case, the task management platform may provide, to the sensor device, a request for the weather data, which may cause the sensor device to measure the weather near the vendor site and to provide the weather data for the measurement to the task management platform.

Additionally, or alternatively, the task management platform may obtain holiday data. For example, the task management platform may obtain holiday data identifying a globally celebrated holiday or event, a national holiday, a local holiday (e.g., local to an area associated with the vendor site), and/or the like. In some cases, the task management platform may be configured with the holiday data (e.g., prior to receiving the request from the user device).

In some implementations, one or more sensor devices described herein may be configured with a set of thresholds that allow the one or more sensor devices to convert events data to pre-scored values that may be used by the data model. For example, if a sensor device captures weather data indicating that a storm is coming, the sensor device may convert the weather data value to a value associated with an increased likelihood of a task to call an individual at the vendor site being performed without delay (e.g., because the storm may reduce foot traffic within the vendor site and make the employee of the vendor site more likely to be available for a phone call). In this case, the sensor device may provide the pre-scored value to the task management platform. In this way, the task management platform receives pre-scored values that may be used to score a particular task, thereby reducing a utilization of processing resources of the task management platform when generating the recommendation and improving a speed at which the user device is able to receive the recommendation.

As shown by reference number 145, the task management platform may obtain user workload data from the third data storage element. For example, the task management platform may obtain user workload data identifying, for a particular time period, a workload capacity for a group of users that perform the job for the organization. The user workload data may include work schedule data identifying a number of tasks allocated to a worker's schedule, worker deadline data identifying a deadline indicating when tasks assigned to a worker are to be completed, worker status data identifying whether a worker is currently engaging in performance of a task, and/or the like.

In some implementations, the task management platform may obtain the user workload data by using a search query to request the user workload data from the third data storage element. For example, the group of workers may perform tasks using a group of user devices, and the group of user devices may support software that monitors and obtains user workload data. In this case, the group of user devices may be configured to periodically provide the user workload data to a central repository (e.g., the third data storage element), such that the task management platform may obtain the user workload data from the central repository.

In some implementations, one or more types of data described above may be automatically provided to the task management platform (e.g., without a query). For example, a particular data storage element may be configured to automatically provide the task management platform with data based on a trigger (e.g., periodically over a particular time period, based receiving notice that the task management platform received a request, and/or the like).

In this way, the task management platform receives a request for a recommendation to identify an optimal task to perform.

As shown in FIG. 1D, and by reference number 150, the task management platform may use the data model to generate the recommendation identifying the task that is to be performed. For example, the task management platform may use the data model to generate a set of priority values for the set of tasks, and may, based on the set of priority values, generate a recommendation to perform a particular task, to transfer the particular task (e.g., to another user within the organization), to schedule the particular task (e.g., for completion at another time period), to have the particular task performed automatically (e.g., by the task management platform, by another device, etc.), and/or the like.

In some implementations, the task management platform may generate a set of priority values for the set of tasks. For example, the task management platform may provide, as input to the data model, the application status data, the data identifying the application status metrics, the events data, and/or the user workload data. This may cause the data model to output a set of priority values for the set of tasks. The set of priority values may be based on features used to train the data model, and may score (e.g., rank) the set of tasks based on a degree of importance of a task (e.g., relative to other tasks), based on a likelihood of the task being performed without delay, based on whether the task is capable of being performed by another user who is available to perform the task, and/or the like.

In some implementations, the task management platform may use the set of priority values to generate the recommendation. For example, the task management platform may generate a recommendation by selecting a task with a highest available priority value.

In some implementations, the task management platform may apply weighted values to the set of priority values to generate the recommendation. For example, the task management platform may generate a first set of priority values based on a degree of importance of performing the set of tasks, a second set of priority values based on a likelihood of the set of tasks being completed without delay, and/or a third set of priority values based on whether one or more of the set of tasks may be performed by another user who is available to perform the one or more tasks. In this case, the task management platform may assign weighted values to the first set of priority values, to the second set of priority values, and/or to the third set of priority values and may select a task with a highest-available score for the recommendation.

In some implementations, the task management platform may use the set of priority values to generate a recommendation to perform a task (e.g., using one or more techniques described above). In some implementations, the task management platform may use the set of priority values to generate a recommendation that includes a list of scored (e.g., ranked) tasks. In some cases, the task management platform may update the list of scored tasks (e.g., periodically over an interval, based on receiving another request, and/or the like).

In some implementations, the task management platform may use the set of priority values to generate a recommendation to transfer a task. For example, the set of priority values may indicate that two tasks both satisfy a threshold priority level, such that the two tasks need to be completed immediately. In this case, the task management platform may identify another user that has a break in his or her schedule and may recommend transferring one of the two tasks to the other user.

In some implementations, the task management platform may use the set of priority values to generate a recommendation to schedule a task. For example, the set of priority values may include priority values indicating a likelihood of the set of tasks being performed without delay at particular time periods. In this case, if a priority value for a particular task indicates that the particular task has a threshold likelihood of being performed without delay if scheduled for another time period, the task management platform may generate a recommendation to schedule performance of the task for the other time period.

In some implementations, the task management platform may generate a recommendation to have a task performed automatically. For example, if the set of tasks include a task that is capable of being performed automatically, the task management platform may generate a recommendation to have the task performed automatically. In some cases, a task may be capable of being performed automatically, but may be preferred to be performed by a human user. In this case, the task management platform may generate a recommendation to have the task performed automatically if a priority value score for the task satisfies a threshold confidence level.

As shown by reference number 155, the task management platform may provide the recommendation to the user device. As shown by reference number 160, the user device may display the recommendation on a user interface, such that the user may view and select the recommendation.

In this way, the task management platform uses a data model trained using machine learning to generate and provide the user device with a recommendation that that considers real-time events that are capable of influencing whether particular tasks are able to be performed.

Figure 1E:
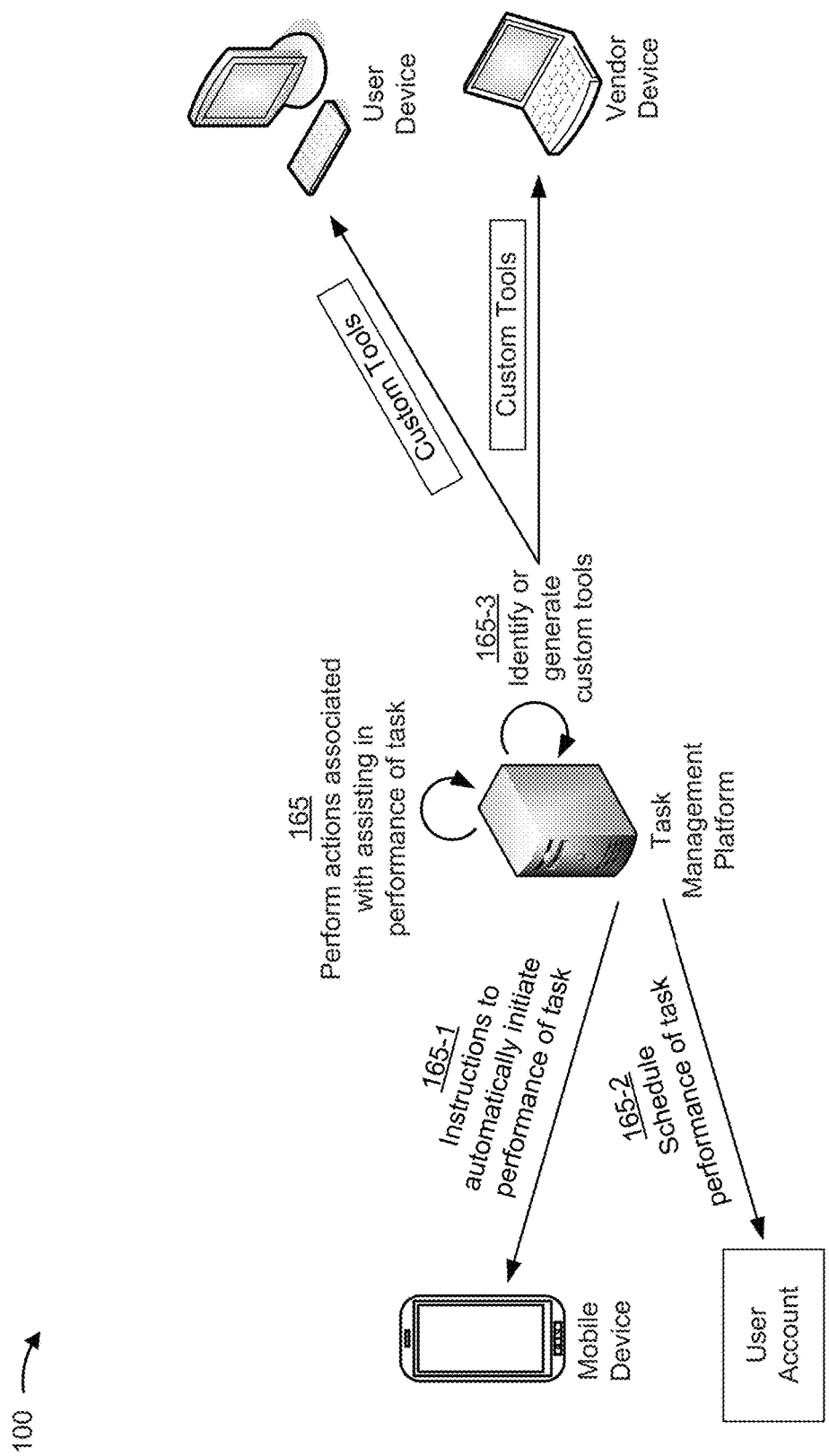

As shown in FIG. 1E, and by reference number 165, the task management platform may perform one or more actions associated with assisting in performance of the task. For example, the task management platform may automatically perform a task, automatically schedule completion of the task, identify or generate a set of custom tools to assist in performance of the task, provide the set of custom tools to the user device and/or to a vendor account of an individual that is to be contacted while a task is being performed, and/or the like.

As shown by reference number 165-1, the task management platform may provide, to a mobile device, instructions to automatically initiate performance of the task. For example, the task management platform may provide instructions indicating to contact a particular vendor site, to ask to speak to a particular individual, to inquire about a particular issue, and/or the like. In some implementations, such as when the mobile device is a work phone owned by the organization, the task management platform may cause the mobile device to automatically call a vendor site, such that the user is able to perform the task without delay.

As shown by reference number 165-2, the task management platform may automatically schedule performance of the task. For example, the task management platform may create a calendar event to perform the task and may add the calendar event to a calendar of the user. Additionally, the task management platform may provide the calendar event to an electronic account of a recipient that is to be contacted.

As shown by reference number 165-3, the task management platform may identify or generate a set of custom tools to assist the user in performing the task. For example, the task management platform may identify or generate a set of custom tools and may provide the set of custom tools for display on an interface of the user device. The set of custom tools may include contact information for one or more employees working at a site that is to be contacted as part of performance of the task, particular application status metrics for the vendor site, a templated script identifying recommended ways to perform the task, and/or the like.

In some implementations, the task management platform may identify one or more custom tools. For example, the task management platform may identify one or more custom tools by using an identifier to search a data structure that associates custom tools with searchable identifiers, such as a vendor site identifier for a vendor site, a vendor identifier for a vendor organization, an organization site identifier for an organization site, a user identifier for a user, an application identifier for an applicant (e.g., of a loan), and/or the like.

In some implementations, the task management platform may tailor a custom tool to a site or individual. For example, a templated script may be created that identifies strategies for calling vendor sites to inquire about low sales numbers. In this case, the task management platform may perform dynamic value replacement to replace placeholder values with values specific to the vendor site, such as names of employees at the vendor site, contact information for the employees, and/or the like.

In some implementations, the task management platform may selectively identify a custom tool. For example, assume a set of templated scripts are created for calling vendor sites to build relationships with vendor employees. Depending on the context of the call, the caller may need to reference different application performance metrics, speak to different employees, use a particular tone of voice, exude a certain level of persistence to try and close a deal, and/or the like. As such, the set of templated scripts may account for one or more these variations.

In this case, the task management platform may selectively identify a custom tool based on one or more rules and/or thresholds, based on another data model, and/or the like. For example, while training the data model, the task management platform may have identified a trend indicating that if a vendor site does not submit a loan application to the organization before a halfway point of the month, there is a very low likelihood of the vendor site submitting any loan applications before the end of the month. As such, when a vendor site is to be called and the vendor site has not submitted any loan applications before the halfway point of the month, the task management platform may be configured with a rule to select a templated script that authorizes the caller to provide the vendor site with new incentives (e.g., such as by allowing customers of the vendor organization to fill out loan applications for a lower APR than what was previously being offered).

In this way, the task management platform generates a recommendation that is based on a degree of importance in performing particular tasks, a likelihood of performance of particular tasks being influenced by real-time events, and/or an availability of other users with the same or similar jobs who may be available to assist in performance of particular tasks. This conserves processing resources and/or network resources relative to an inferior platform that might otherwise expend resources generating recommendations for suboptimal tasks (e.g., tasks that are not capable of being completed on a first attempt due to influence from a real-time event), conserves processing resources and/or network resources of devices used to attempt to complete the suboptimal tasks, and/or the like.

As indicated above, FIGS. 1A-1E are provided merely as an example. Other examples are possible and may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2:
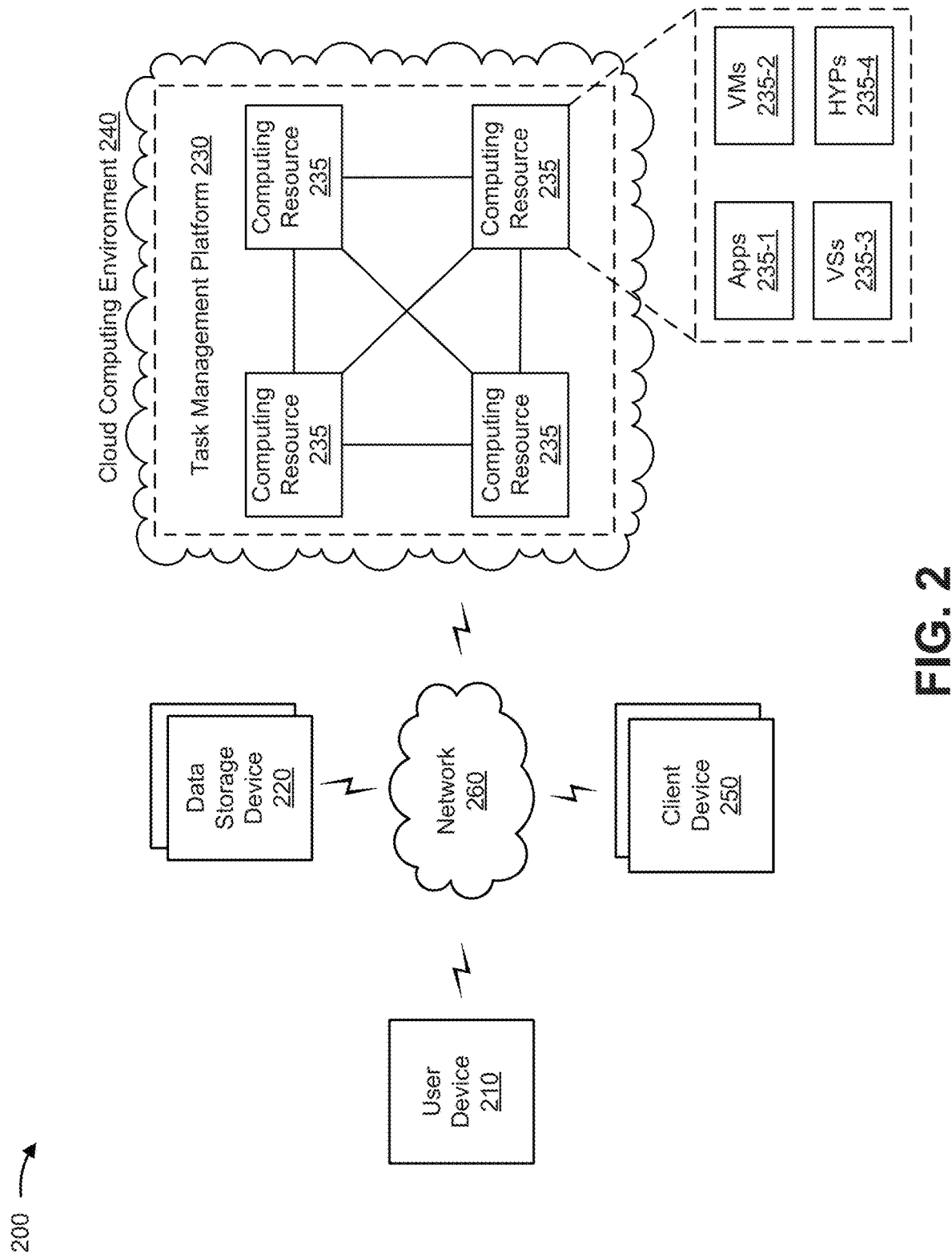
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a group of data storage devices 220, a task management platform 230 hosted by a cloud computing environment 240, a client device 250, and/or a network 260. Devices of environment 200 may interconnect via wired connections, wireless connections, or a combination of wired and wireless connections.

User device 210 includes one or more devices capable of receiving, generating, storing, processing, and/or providing information associated with a task. For example, user device 210 may include a device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may submit a request for a task to task management platform 230.

Data storage device 220 includes one or more devices capable of receiving, storing, generating, determining, and/or providing information associated with a task. For example, data storage device 220 may include a server device or a group of server devices. In some implementations, data storage device 220 may store data using a data structure.

In some implementations, data storage device 220 may include a first data storage device for storing historical data. Additionally, or alternatively, data storage device 220 may include a second data storage device for storing application status data. Additionally, or alternatively, data storage device 220 may include a third data storage device 220 for storing user workload data. Additionally, or alternatively, data storage device 220 may include a group of data storage devices 220 that collectively store events data identifying real-time events. For example, the group of data storage devices 220 may include a first data storage device 220 for storing data identifying foot traffic, a second data storage device 220 for storing weather data, a third data storage device 220 for storing data identifying one or more sales occurring at a vendor site, and/or the like.

Task management platform 230 includes one or more devices capable of receiving, storing, processing, generating, determining, and/or providing information associated with a task. For example, task management platform 230 may include a server device (e.g., a host server, a web server, an application server, etc.), a data center device, or a similar device. In some implementations, task management platform 230 may be part of a task management system used to manage one or more jobs for an organization.

In some implementations, task management platform 230 may obtain historical data from the first data storage device 220. In some implementations, task management platform 230 may obtain application status data from the second data storage device 220. Additionally, or alternatively, task management platform 230 may obtain user workload data from the third data storage device 220. Additionally, or alternatively, task management platform 230 may obtain events data for a group of sites from the group of data storage devices 220.

In some implementations, task management platform 230 may provide a recommendation to user device 210. In some implementations, task management platform 230 may provide user device 210 and/or client device 250 (e.g., a vendor device) with one or more custom tools to assist in performance of a task. In some implementations, task management platform 230 may interact with a user account to schedule performance of the task. In some implementations, task management platform 230 may provide instructions to automatically initiate performance of the task to a mobile device (e.g., which may be the same user device 210 that provided the request for a recommendation or a different user device 210).

In some implementations, as shown, task management platform 230 may be hosted in cloud computing environment 240. Notably, while implementations described herein describe task management platform 230 as being hosted in cloud computing environment 240, in some implementations, task management platform 230 may not be cloud-based (i.e., may be implemented outside of a cloud computing environment) or may be partially cloud-based.

Cloud computing environment 240 includes an environment that hosts task management platform 230. Cloud computing environment 240 may provide computation, software, data access, storage, etc. services that do not require end-user knowledge of a physical location and configuration of system(s) and/or device(s) that hosts task management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host task management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include software associated with task management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems.

Client device 250 includes one or more devices capable of receiving, generating, storing, processing, and/or providing information associated with a task. For example, client device 250 may include a device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, client device 250 may be used to receive a call from user device 210 or a similar type of device. In some implementations, client device 250 may receive information associated with a task that is to be performed from task management platform 230, user device 210, and/or a similar type of device.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
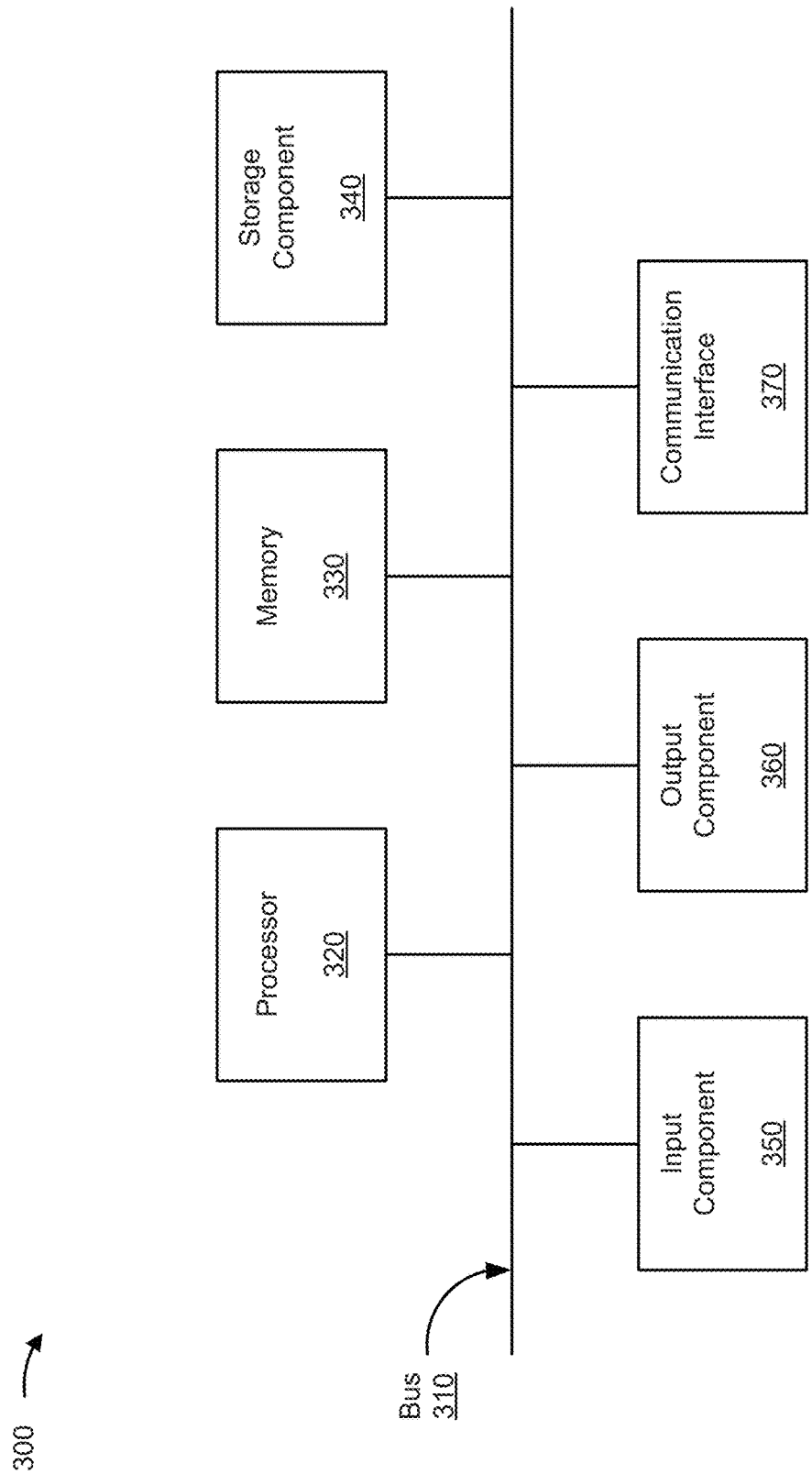
FIG. 3 is a diagram of example components of one or more devices of FIG. 2.

FIG. 3 is a diagram of example components of a device 300. Device 300 may correspond to user device 210, data storage device 220, task management platform 230, and/or client device 250. In some implementations, user device 210, data storage device 220, task management platform 230, and/or client device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
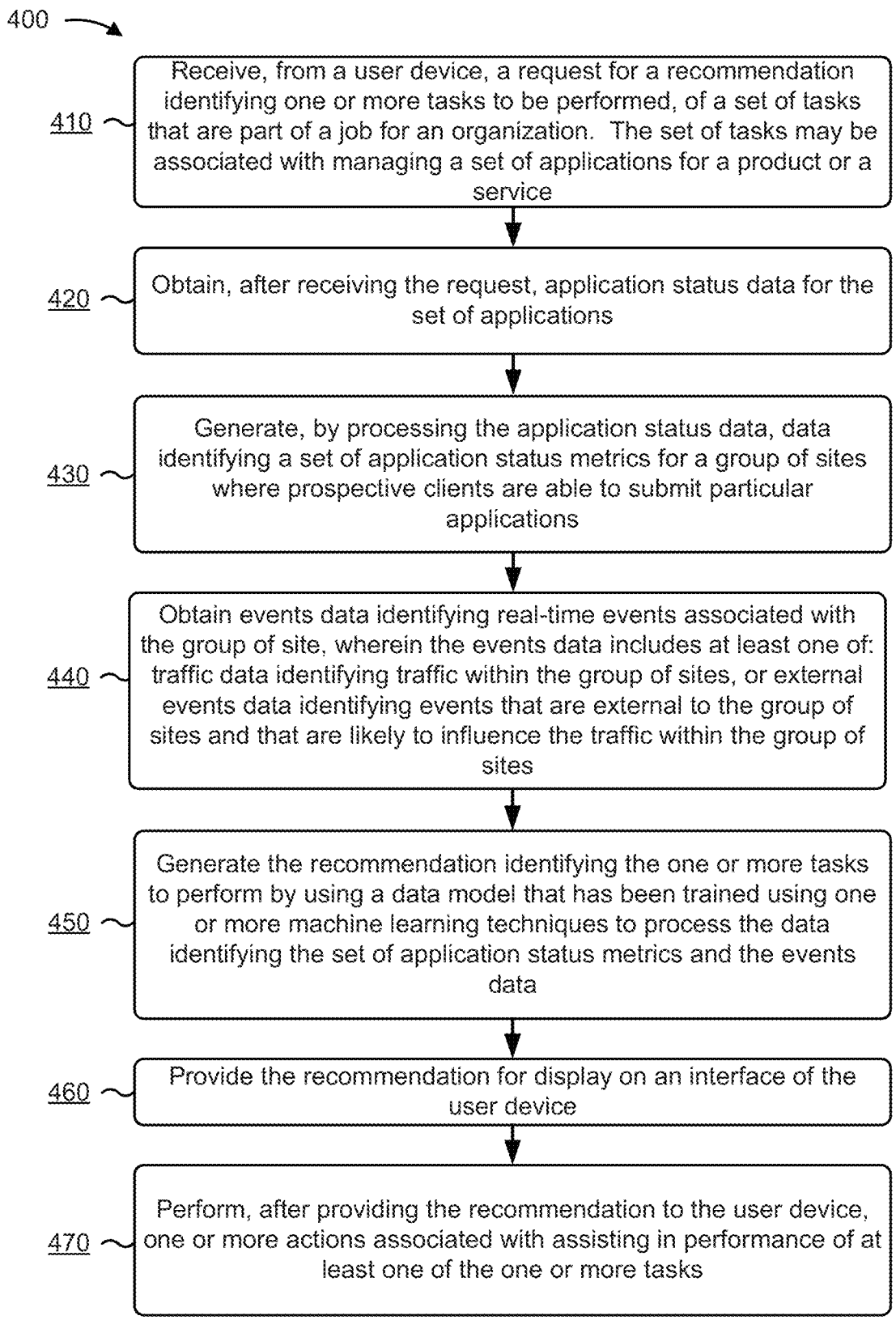
FIGS. 4-6 are flow charts of an example process for using machine learning to generate recommendations that optimize completion and/or performance of a set of tasks that are to be performed as part of a job within an organization.

FIG. 4 is a flow chart of an example process 400 for using machine learning to generate recommendations that optimize completion and/or performance of a set of tasks that are to be performed as part of a job within an organization. In some implementations, one or more process blocks of FIG. 4 may be performed by a task management platform (e.g., task management platform 230). In some implementations, one or more process blocks of FIG. 4 may be performed by another device or a group of devices separate from or including the task management platform, such as a user device (e.g., user device 210), one or more data storage devices (e.g., data storage devices 220), and/or a client device (e.g., client device 250).

As shown in FIG. 4, process 400 may include receiving, from a user device, a request for a recommendation identifying one or more tasks to be performed, of a set of tasks that are part of a job for an organization, wherein the set of tasks are associated with managing a set of applications for a product or a service (block 410). For example, the task management platform (e.g., task management platform 230, using computing resource 235, processor 320, memory 330, storage component 340, input component 350, communication interface 370, and/or the like) may receive, from the user device (e.g., user device 210), a request for a recommendation identifying one or more tasks to be performed, of a set of tasks that are part of a job for an organization, as described above in connection with FIGS. 1A-1E. In some implementations, the set of tasks may be associated with managing a set of applications for a product or a service.

As further shown in FIG. 4, process 400 may include obtaining, after receiving the request, application status data for the set of applications (block 420). For example, the task management platform (e.g., task management platform 230, using computing resource 235, processor 320, memory 330, storage component 340, input component 350, communication interface 370, and/or the like) may obtain, after receiving the request, application status data for the set of applications, as described above in connection with FIGS. 1A-1E.

As further shown in FIG. 4, process 400 may include generating, by processing the application status data, data identifying a set of application status metrics for a group of sites where prospective clients are able to submit particular applications (block 430). For example, the task management platform (e.g., task management platform 230, using computing resource 235, processor 320, memory 330, storage component 340, and/or the like) may generate, by processing the application status data, data identifying a set of application status metrics for a group of sites where prospective clients are able to submit particular applications, as described above in connection with FIGS. 1A-1E.

As further shown in FIG. 4, process 400 may include obtaining events data identifying real-time events associated with the group of sites, wherein the events data includes at least one of: internal events data identifying events within the group of sites, or external events data identifying events that are external to the group of sites and that are likely to influence the events within the group of sites (block 440). For example, the task management platform (e.g., task management platform 230, using computing resource 235, processor 320, memory 330, storage component 340, input component 350, communication interface 370, and/or the like) may obtain events data identifying real-time events associated with the group of sites, as described above in connection with FIGS. 1A-1E. In some implementations, the events data may include at least one of: internal events data identifying events within the group of sites, or external events data identifying events that are external to the group of sites and that are likely to influence the events within the group of sites.

As further shown in FIG. 4, process 400 may include generating the recommendation identifying the one or more tasks to perform by using a data model that has been trained using one or more machine learning techniques to process the data identifying the set of application status metrics and the events data (block 450). For example, the task management platform (e.g., task management platform 230, using computing resource 235, processor 320, memory 330, storage component 340, input component 350, communication interface 370, and/or the like) may generate the recommendation identifying the one or more tasks to perform by using a data model that has been trained using one or more machine learning techniques to process the data identifying the set of application status metrics and the events data, as described above in connection with FIGS. 1A-1E.

As further shown in FIG. 4, process 400 may include providing the recommendation for display on an interface of the user device (block 460). For example, the task management platform (e.g., task management platform 230, using computing resource 235, processor 320, memory 330, storage component 340, output component 360, communication interface 370, and/or the like) may provide the recommendation for display on an interface of the user device, as described above in connection with FIGS. 1A-1E.

As further shown in FIG. 4, process 400 may include performing, after providing the recommendation to the user device, one or more actions associated with assisting in performance of at least one of the one or more tasks (block 470). For example, the task management platform (e.g., task management platform 230, using computing resource 235, processor 320, memory 330, storage component 340, input component 350, output component 360, communication interface 370, and/or the like) may perform, after providing the recommendation to the user device, one or more actions associated with assisting in performance of at least one of the one or more tasks, as described above in connection with FIGS. 1A-1E.

Process 400 may include additional implementations, such as any single implementation or any combination of implementations described below and/or in connection with one or more other processes described elsewhere herein.

In some implementations, when generating the recommendation, the task management platform may provide the data identifying the set of application status metrics and the events data as input to the data model to cause the data model to output a set of priority values for the set of tasks. The set of priority values may be based on a likelihood of the events data delaying particular tasks from being performed. In some implementations, the task management platform may generate the recommendation based on the set of priority values.

In some implementations, when obtaining the events data identifying the real-time events associated with the group of sites, the task management platform may provide a request for the events data to a storage device that stores the traffic data. The traffic data may identify foot traffic or vehicle traffic within the group of sites and may have been collected using a crowdsourcing technique. In some implementations, the task management platform may receive the traffic data from the storage device based on providing the request. In some implementations, the task management platform may receive, from another storage device, the external events data that includes weather data identifying weather near the group of sites.

In some implementations, the recommendation may include at least one of: a first recommendation identifying a first task to perform, a second recommendation identifying an ordered subset of tasks to perform, a third recommendation identifying a second task to transfer to another user associated with the organization, or a fourth recommendation identifying a third task to be automatically performed by the device or by another device.

In some implementations, when performing the one or more actions, the task management platform may identify one or more custom tools to assist in performing the one or more tasks. In some implementations, the task management platform may provide the one or more custom tools for display on the interface of the user device to make the one or more custom tools accessible while the one or more tasks are being performed. In some implementations, when performing the one or more actions, the task management platform may automatically perform particular actions to initiate performance of a task, of the one or more tasks, based on receiving instructions from the user device or based on the task satisfying a threshold priority level.

In some implementations, the task management platform may obtain, after receiving the request, user workload data identifying a workload capacity for a group of users that perform the job for the organization. In some implementations, when generating the recommendation, the task management platform may generate, as the recommendation and by using the data model to process the data identifying the set of application status metrics, the events data, and the user workload data, a particular recommendation to perform a first task, of one or more tasks, and to transfer a second task, of the one or more tasks, to a task management queue of another user within the organization.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
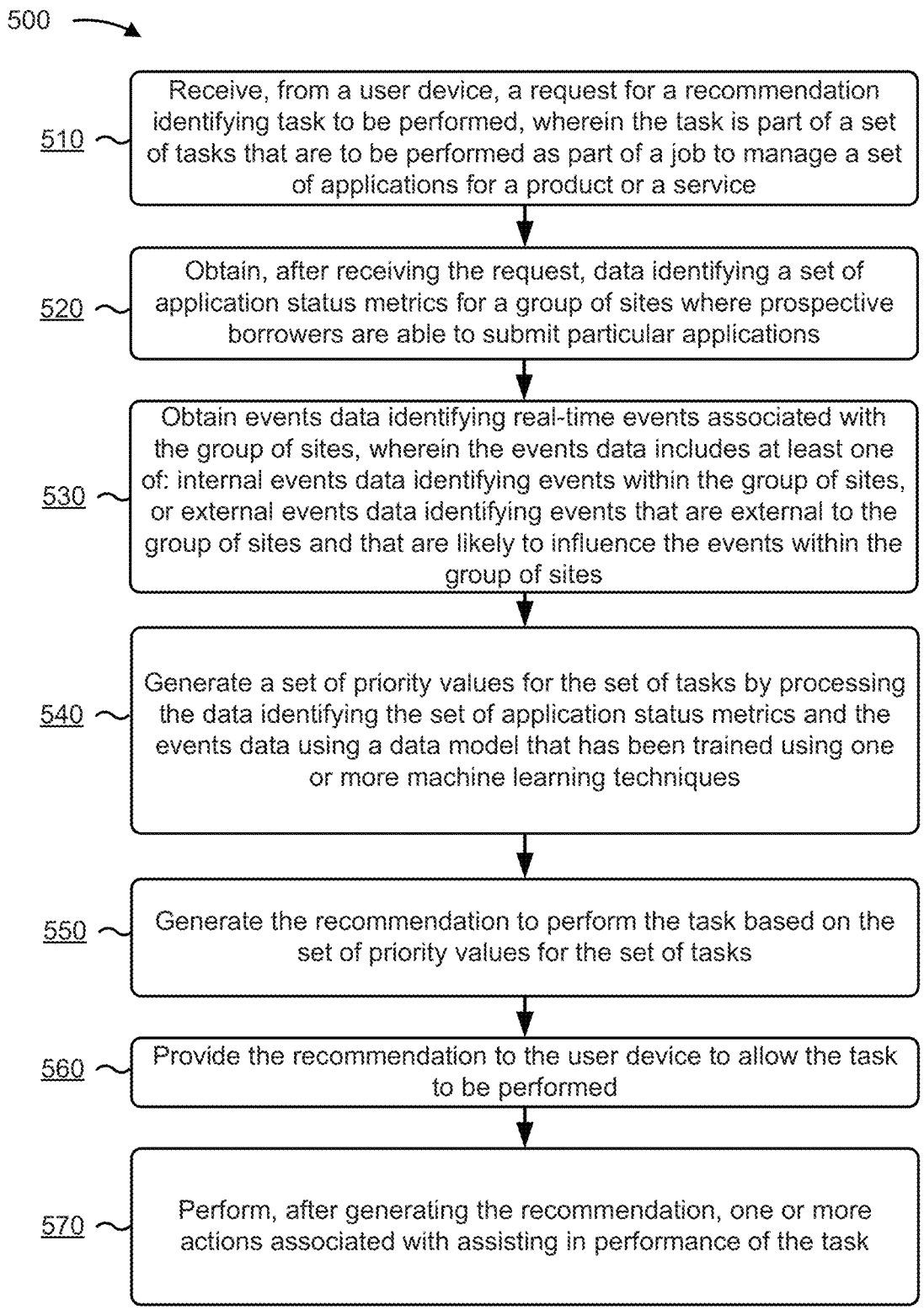

FIG. 5 is a flow chart of an example process 500 for using machine learning to generate recommendations that optimize completion and/or performance of a set of tasks that are to be performed as part of a job within an organization. In some implementations, one or more process blocks of FIG. 5 may be performed by a task management platform (e.g., task management platform 230). In some implementations, one or more process blocks of FIG. 5 may be performed by another device or a group of devices separate from or including the task management platform, such as a user device (e.g., user device 210), one or more data storage devices (e.g., data storage devices 220), and/or a client device (e.g., client device 250).

As shown in FIG. 5, process 500 may include receiving, from a user device, a request for a recommendation identifying a task to be performed, wherein the task is part of a set of tasks that are to be performed as part of a job to manage a set of applications for a product or a service (block 510). For example, the task management platform (e.g., task management platform 230, using computing resource 235, processor 320, memory 330, storage component 340, input component 350, communication interface 370, and/or the like) may receive, from the user device (e.g., user device 210), a request for a recommendation identifying a task to be performed, as described above in connection with FIGS. 1A-1E. In some implementations, the task may be part of a set of tasks that are to be performed as part of a job to manage a set of applications for a product or a service.

As further shown in FIG. 5, process 500 may include obtaining, after receiving the request, data identifying a set of application status metrics for a group of sites where prospective borrowers are able to submit particular applications (block 520). For example, the task management platform (e.g., task management platform 230, using computing resource 235, processor 320, memory 330, storage component 340, input component 350, communication interface 370, and/or the like) may obtain, after receiving the request, data identifying a set of application status metrics for a group of sites where prospective borrowers are able to submit particular applications, as described above in connection with FIGS. 1A-1E.

As further shown in FIG. 5, process 500 may include obtaining events data identifying real-time events associated with the group of sites, wherein the events data includes at least one of: internal events data identifying events within the group of sites, or external events data identifying events that are external to the group of sites and that are likely to influence the events within the group of sites (block 530). For example, the task management platform (e.g., task management platform 230, using computing resource 235, processor 320, memory 330, storage component 340, input component 350, communication interface 370, and/or the like) may obtain events data identifying real-time events associated with the group of sites, as described above in connection with FIGS. 1A-1E. In some implementations, the events data may include at least one of: internal events data identifying events within the group of sites (e.g., traffic data, and/or the like), or external events data identifying events that are external to the group of sites and that are likely to influence the events within the group of sites.

As further shown in FIG. 5, process 500 may include generating a set of priority values for the set of tasks by processing the data identifying the set of application status metrics and the events data using a data model that has been trained using one or more machine learning techniques (block 540). For example, the task management platform (e.g., task management platform 230, using computing resource 235, processor 320, memory 330, storage component 340, and/or the like) may generate a set of priority values for the set of tasks by processing the data identifying the set of application status metrics and the events data using a data model that has been trained using one or more machine learning techniques, as described above in connection with FIGS. 1A-1E.

As further shown in FIG. 5, process 500 may include generating the recommendation to perform the task based on the set of priority values for the set of tasks (block 550). For example, the task management platform (e.g., task management platform 230, using computing resource 235, processor 320, memory 330, storage component 340, and/or the like) may generate the recommendation to perform the task based on the set of priority values for the set of tasks, as described above in connection with FIGS. 1A-1E.

As further shown in FIG. 5, process 500 may include providing the recommendation to the user device to allow the task to be performed (block 560). For example, the task management platform (e.g., task management platform 230, using computing resource 235, processor 320, memory 330, storage component 340, output component 360, communication interface 370, and/or the like) may provide the recommendation to the user device to allow the task to be performed, as described above in connection with FIGS. 1A-1E.

As further shown in FIG. 5, process 500 may include performing, after generating the recommendation, one or more actions associated with assisting in performance of the task (block 570). For example, the task management platform (e.g., task management platform 230, using computing resource 235, processor 320, memory 330, storage component 340, input component 350, output component 360, communication interface 370, and/or the like) may perform, after generating the recommendation, one or more actions associated with assisting in performance of the task, as described above in connection with FIGS. 1A-1E.

Process 500 may include additional implementations, such as any single implementation or any combination of implementations described below and/or in connection with one or more other processes described elsewhere herein.

In some implementations, the set of priority values may be based on whether the set of application status metrics for the group of sites satisfy one or more threshold performance levels. For example, a priority value may be based on a threshold performance level associated with an application status metric (e.g., a metric relating to an application, a metric relating to a site, and/or the like). In some implementations, the set of priority values for the set of tasks may be based on a likelihood of the events data delaying particular tasks from being performed.

In some implementations, the request for the recommendation identifying the task to perform may be a particular request to identify a subset of the set of tasks that are to be performed within a particular time period. In some implementations, the task management platform may periodically generate an updated recommendation throughout the particular time period. The updated recommendation may include at least one of: a reordered subset of the set of tasks, or new tasks included within the subset of the set of tasks. In some implementations, the task management platform may provide the updated recommendation for display on an interface of the user device.

In some implementations, the one or more actions may include a first action to establish a communication session between the user device or another device and a receiving device associated with a recommended task, a second action to send an electronic message to the receiving device, a third action to transfer the recommended task to a task management docket of another user, or a fourth action to update an aspect of a particular application of the set of applications.

In some implementations, when generating the recommendation, the task management platform may identify, as part of the recommendation, a site identifier for a site that is involved in performance of the task. In some implementations, the task management platform may identify one or more custom tools to assist in performing the task by using the site identifier to perform a search query to search a data structure that associates the site identifier with the one or more custom tools that are capable of assisting in performance of the task. In some implementations, when providing the recommendation to the user device, the task management platform may provide the one or more custom tools for display on an interface of the user device to permit the user to use the one or more custom tools to perform the task.

In some implementations, when providing the recommendation to the user device, the task management platform may provide, for display on an interface of the user device, an object identifying the recommendation and a task completion object that allows the user to mark the task as completed. The selection of the task completion object may cause the device to use the data model to generate a new recommendation identifying another task to perform.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
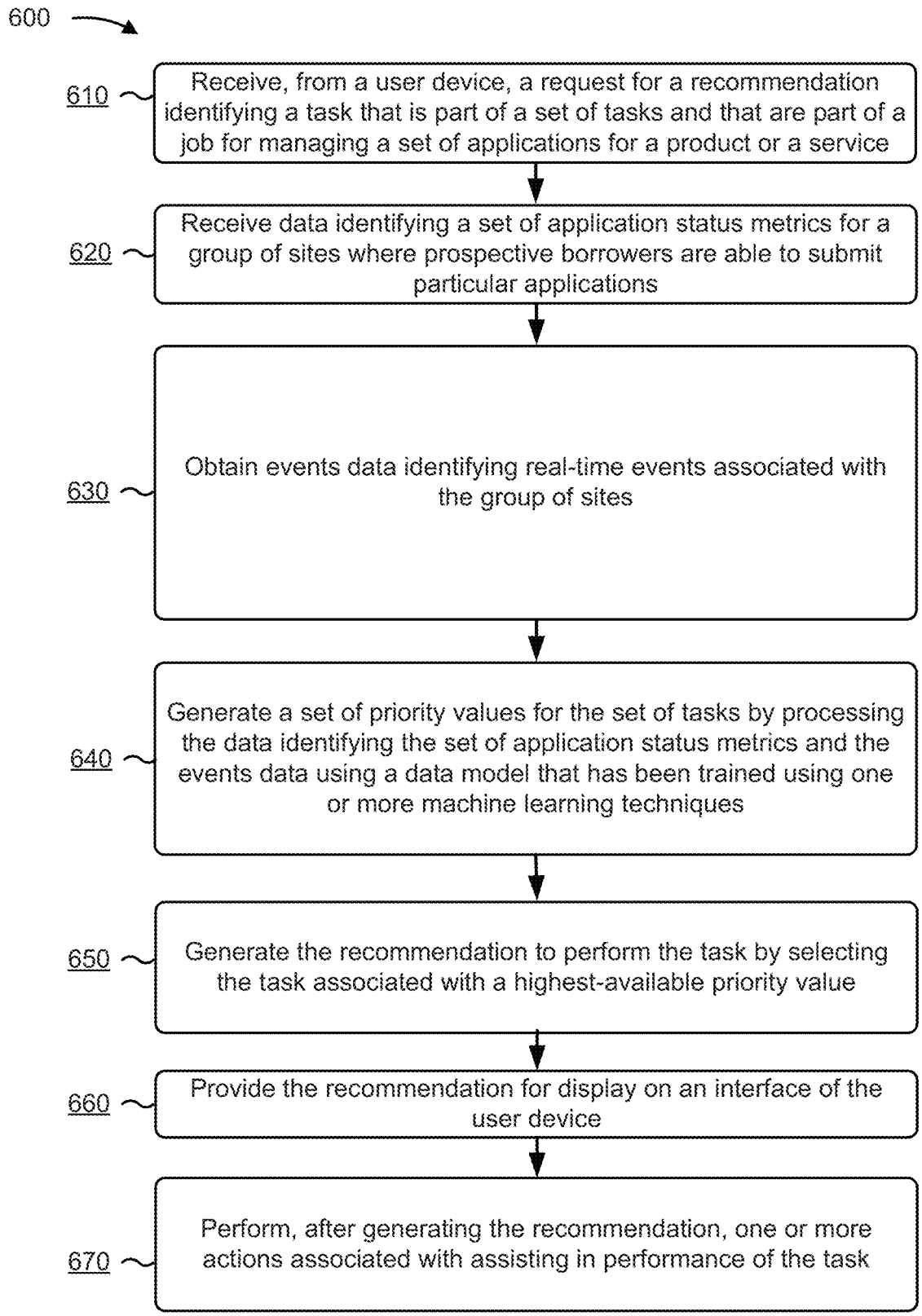

FIG. 6 is a flow chart of an example process 600 for using machine learning to generate recommendations that optimize completion and/or performance of a set of tasks that are to be performed as part of a job within an organization. In some implementations, one or more process blocks of FIG.

6 may be performed by a task management platform (e.g., task management platform 230). In some implementations, one or more process blocks of FIG. 6 may be performed by another device or a group of devices separate from or including the task management platform, such as a user device (e.g., user device 210), one or more data storage devices (e.g., data storage devices 220), and/or a client device (e.g., client device 250).

As shown in FIG. 6, process 600 may include receiving, from a user device, a request for a recommendation identifying a task that is part of a set of tasks and that are part of a job for managing a set of applications for a product or a service (block 610). For example, the task management platform (e.g., task management platform 230, using computing resource 235, processor 320, memory 330, storage component 340, input component 350, communication interface 370, and/or the like) may receive, from the user device (e.g., user device 210), a request for a recommendation identifying a task that is part of a set of tasks and that are part of a job for managing a set of applications for a product or a service, as described above in connection with FIGS. 1A-1E.

As further shown in FIG. 6, process 600 may include receiving data identifying a set of application status metrics for a group of sites where prospective borrowers are able to submit particular applications (block 620). For example, the task management platform (e.g., task management platform 230, using computing resource 235, processor 320, memory 330, storage component 340, input component 350, communication interface 370, and/or the like) may receive data identifying a set of application status metrics for a group of sites where prospective borrowers are able to submit particular applications, as described above in connection with FIGS. 1A-1E.

As further shown in FIG. 6, process 600 may include obtaining events data identifying real-time events associated with the group of sites (block 630). For example, the task management platform (e.g., task management platform 230, using computing resource 235, processor 320, memory 330, storage component 340, input component 350, communication interface 370, and/or the like) may obtain events data identifying real-time events associated with the group of sites, as described above in connection with FIGS. 1A-1E.

As further shown in FIG. 6, process 600 may include generating a set of priority values for the set of tasks by processing the data identifying the set of application status metrics and the events data using a data model that has been trained using one or more machine learning techniques (block 640). For example, the task management platform (e.g., task management platform 230, using computing resource 235, processor 320, memory 330, storage component 340, and/or the like) may generate a set of priority values for the set of tasks by processing the data identifying the set of application status metrics and the events data using a data model that has been trained using one or more machine learning techniques, as described above in connection with FIGS. 1A-1E.

As further shown in FIG. 6, process 600 may include generating the recommendation to perform the task by selecting the task associated with a highest-available priority value (block 650). For example, the task management platform (e.g., task management platform 230, using computing resource 235, processor 320, memory 330, storage component 340, and/or the like) may generate the recommendation to perform the task by selecting the task associated with a highest-available priority value, as described above in connection with FIGS. 1A-1E.

As further shown in FIG. 6, process 600 may include providing the recommendation for display on an interface of the user device (block 660). For example, the task management platform (e.g., task management platform 230, using computing resource 235, processor 320, memory 330, storage component 340, output component 360, communication interface 370, and/or the like) may provide the recommendation for display on an interface of the user device, as described above in connection with FIGS. 1A-1E.

As further shown in FIG. 6, process 600 may include performing, after generating the recommendation, one or more actions associated with assisting in performance of the task (block 670). For example, the task management platform (e.g., task management platform 230, using computing resource 235, processor 320, memory 330, storage component 340, input component 350, output component 360, communication interface 370, and/or the like) may perform, after generating the recommendation, one or more actions associated with assisting in performance of the task, as described above in connection with FIGS. 1A-1E.

Process 600 may include additional implementations, such as any single implementation or any combination of implementations described below and/or in connection with one or more other processes described elsewhere herein.

In some implementations, the set of priority values for the set of tasks may be based on a likelihood of the events data delaying particular tasks from being performed. In some implementations, when obtaining the events data identifying the real-time events associated with the group of sites, the task management platform may provide, to one or more sets of sensor devices associated with the group of sites, a request for the events data, to cause the one or more sets of sensor devices to capture the events data. The one or more sets of sensor devices may be configured with a set of thresholds that allow the one or more sets of sensor devices to convert the events data to scored data model values that serve as indicators of whether particular tasks are capable of being performed without delay. Additionally, the task management platform may receive, from the one or more sets of sensor devices, the scored data model values that serve as indicators of whether the particular tasks are capable of being performed without delay. In some implementations, when generating the set of priority values, the task management platform may generate the set of priority values based on the scored data model values.

In some implementations, the events data may include at least one of: traffic data identifying traffic within the group of sites, or external events data identifying events that are external to the group of sites and that are likely to influence the traffic within the group of sites. In some implementations, when performing the one or more actions associated with assisting in the performance of the task, the task management platform may identify one or more custom tools to assist in performing the task. The one or more custom tools may include at least one of: contact information for a group of employees working at a site that is involved in performance of the task, particular application status metrics for the site, or a templated script identifying recommended ways to perform the task. In some implementations, the task management platform may provide the one or more custom tools for display on the interface of the user device to make the one or more custom tools accessible while the task is being performed.

In some implementations, when providing the recommendation to the user device, the task management platform may provide the recommendation for display on the interface of the user device. The interface may display an object identifying the task that is to be performed and one or more feedback objects that allow the user to agree or disagree with the recommendation. In some implementations, the task management platform may receive, from the user device, feedback data indicating whether the user agreed or disagreed with the recommendation. In some implementations, the task management platform may retrain the data model using the feedback data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the task management platform generates a recommendation that considers a degree of importance in performing particular tasks, a likelihood of performance of particular tasks being influenced by real-time events, availability of other users with the same or similar jobs who may be available to assist in performance of particular tasks, and/or the like. This conserves processing resources and/or network resources relative to an inferior platform that might otherwise expend resources generating recommendations for sub-optimal tasks (e.g., tasks that are not capable of being completed on a first attempt due to influence from a real-time event), conserves processing resources and/or network resources of devices used to attempt to complete the sub-optimal tasks, and/or the like.

Furthermore, several different stages of the process for generating the recommendation are automated, which may remove human subjectivity and waste from the process, and which may improve speed and efficiency of the process and conserve computing resources (e.g., processor resources, memory resources, and/or the like). Additionally, implementations described herein use a rigorous, computerized process to perform tasks or roles that were not previously performed or were previously performed using subjective human intuition or input. For example, the task management platform may intelligently identify and/or generate custom tools that may be used to assist users in performing tasks, such as by identifying contact information of an individual that needs to be contacted, identifying application status metrics that may be relevant when contacting the individual, generating templated scripts that are tailored to individual or vendor organization being contacted, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, operatively connected to the one or more memories, to:
receive, from a user device, a request for a recommendation identifying one or more tasks to be performed, of a set of tasks that are part of a job for an organization,
wherein the set of tasks are associated with managing a set of applications for a product or a service, each application, in the set of applications, being associated with at least one individual applying for the product or the service;
obtain, after receiving the request, application status data for the set of applications;
generate, by processing the application status data, data identifying a set of application status metrics for a group of sites where prospective clients are able to submit particular applications;

obtain events data identifying real-time events associated with the group of sites,
wherein the events data includes at least one of:
traffic data identifying foot traffic or vehicle traffic within the group of sites, or
external events data identifying events that are external to the group of sites and that are likely to influence the foot traffic or the vehicle traffic within the group of sites;
generate the recommendation by using a data model that has been trained using one or more machine learning techniques to process the data identifying the set of application status metrics and the events data,
wherein the one or more processors, when generating the recommendation, are to:
provide the data identifying the set of application status metrics and the events data as input to the data model to cause the data model to output a set of priority values for the set of tasks,
wherein the set of priority values are based on a likelihood of the events data delaying particular tasks from being performed;
process the set of priority values to identify a highest-available priority value; and
generate the recommendation based on the highest-available priority value;
provide the recommendation for display on an interface of the user device; and
perform, after providing the recommendation to the user device, one or more actions associated with assisting in performance of at least one of the one or more tasks.

2. The device of claim 1, wherein the one or more processors, when obtaining the events data identifying the real-time events associated with the group of sites, are to:
provide a request for the events data to a storage device that stores the traffic data,
wherein the traffic data has been collected using a crowdsourcing technique,
receive the traffic data from the storage device based on providing the request, and
receive, from another storage device, the external events data that includes weather data identifying weather near the group of sites.

3. The device of claim 1, wherein the recommendation includes at least one of:
a first recommendation identifying a first task to perform,
a second recommendation identifying an ordered subset of tasks to perform,
a third recommendation identifying a second task to transfer to another user associated with the organization, or
a fourth recommendation identifying a third task to be automatically performed by the device or by another device.

4. The device of claim 1, wherein the one or more processors, when performing the one or more actions, are to:
identify one or more custom tools to assist in performing the one or more tasks; and
provide the one or more custom tools for display on the interface of the user device to make the one or more custom tools accessible while the one or more tasks are being performed.

5. The device of claim 1, wherein the one or more processors, when performing the one or more actions, are to:
automatically perform particular actions to initiate performance of a task, of the one or more tasks, based on receiving instructions from the user device or based on the task satisfying a threshold priority level.

6. The device of claim 1, wherein the one or more processors are further to:
obtain, after receiving the request, user workload data identifying a workload capacity for a group of users that perform the job for the organization; and
wherein the recommendation comprises a particular recommendation to perform a first task, of one or more tasks, and to transfer a second task, of the one or more tasks, to a task management queue of another user within the organization.

7. The device of claim 1, wherein the set of priority values for the set of tasks are further based on availability of other users capable of performing particular tasks.

8. A method, comprising:
receiving, by a device and from a user device, a request for a recommendation identifying a task to be performed,
wherein the task is part of a set of tasks that are to be performed as part of a job to manage a set of applications for a product or a service,
each application, in the set of applications, being associated with at least one individual applying for the product or the service;
obtaining, by the device and after receiving the request, data identifying a set of application status metrics for a group of sites where prospective borrowers are able to submit particular applications;
obtaining, by the device, events data identifying real-time events associated with the group of sites,
wherein the events data includes at least one of:
internal events data identifying events associated with foot traffic or vehicle traffic within the group of sites, or
external events data identifying events that are external to the group of sites and that are likely to influence the foot traffic or vehicle traffic within the group of sites;
generating, by the device, a set of priority values for the set of tasks by processing the data identifying the set of application status metrics and the events data using a data model that has been trained using one or more machine learning techniques,
wherein generating the set of priority values comprises:
providing, by the device, the data identifying the set of application status metrics and the events data as input to the data model to cause the data model to output the set of priority values,
wherein the set of priority values are based on a likelihood of the events data delaying particular tasks from being performed;
processing, by the device, the set of priority values to determine that a highest-available priority value is associated with the task;
generating, by the device, the recommendation based on the determining that the highest-available priority value is associated with the task;
providing, by the device, the recommendation to the user device to allow the task to be performed; and
performing, by the device and after generating the recommendation, one or more actions associated with assisting in performance of the task.

9. The method of claim 8, wherein the set of priority values are based on whether the set of application status metrics for the group of sites satisfy one or more threshold performance levels.

10. The method of claim 8, wherein the set of priority values for the set of tasks are further based on availability of other users capable of performing particular tasks.

11. The method of claim 8, wherein the request for the recommendation identifying the task to perform is a particular request to identify a subset of the set of tasks that are to be performed within a particular time period; and
the method further comprising:
periodically generating an updated recommendation throughout the particular time period,
wherein the updated recommendation includes at least one of:
a reordered subset of the set of tasks, or
new tasks included within the subset of the set of tasks; and
providing the updated recommendation for display on an interface of the user device.

12. The method of claim 8, wherein the one or more actions includes one or more of:
a first action to establish a communication session between the user device or another device and a receiving device associated with a recommended task,
a second action to send an electronic message to the receiving device,
a third action to transfer the recommended task to a task management docket of another user, or
a fourth action to update an aspect of a particular application of the set of applications.

13. The method of claim 8, wherein generating the recommendation includes identifying, as part of the recommendation, a site identifier for a site that is involved in performance of the task; the method further comprising:
identifying one or more custom tools to assist in performing the task by using the site identifier to perform a search query to search a data structure that associates the site identifier with the one or more custom tools that are capable of assisting in performance of the task; and
wherein providing the recommendation to the user device comprises:
providing the one or more custom tools for display on an interface of the user device to permit a user of the user device to use the one or more custom tools to perform the task.

14. The method of claim 8, wherein providing the recommendation to the user device comprises:
providing, for display on an interface of the user device, an object identifying the recommendation and a task completion object that allows a user of the user device to mark the task as completed,
wherein selection of the task completion object causes the device to use the data model to generate a new recommendation identifying another task to perform.

15. A non-transitory computer-readable medium storing instructions, the instructions comprising:
one or more instructions that, when executed by one or more processors, cause the one or more processors to:
receive, from a user device, a request for a recommendation identifying a task that is part of a set of tasks and that are part of a job for managing a set of applications for a product or a service,
each application, in the set of applications, being associated with at least one individual applying for the product or the service;
receive data identifying a set of application status metrics for a group of sites where prospective borrowers are able to submit particular applications;
obtain events data identifying real-time events associated with the group of sites,
wherein the events data includes at least one of:
traffic data identifying foot traffic or vehicle traffic within the group of sites, or
external events data identifying events that are external to the group of sites and that are likely to influence the foot traffic or vehicle traffic within the group of sites;
generate a set of priority values for the set of tasks by processing the data identifying the set of application status metrics and the events data using a data model that has been trained using one or more machine learning techniques,
wherein the one or more instructions, that cause the one or more processors to generate the set of priority values, cause the one or more processors to:
provide the data identifying the set of application status metrics and the events data as input to the data model to cause the data model to output the set of priority values,
wherein the set of priority values are based on a likelihood of the events data delaying particular tasks from being performed;
process the set of priority values to determine that the task is associated with a highest-available priority value;
generate the recommendation by selecting the task associated with the highest-available priority value;
provide the recommendation for display on an interface of the user device; and
perform, after generating the recommendation, one or more actions associated with assisting in performance of the task.

16. The non-transitory computer-readable medium of claim 15, wherein the set of priority values for the set of tasks are further based on availability of other users capable of performing particular tasks.

17. The non-transitory computer-readable medium of claim 15, wherein the one or more instructions, that cause the one or more processors to obtain the events data identifying the real-time events associated with the group of sites, cause the one or more processors to:
provide, to one or more sets of sensor devices associated with the group of sites, a request for the events data, to cause the one or more sets of sensor devices to capture the events data,
wherein the one or more sets of sensor devices are configured with a set of thresholds that allow the one or more sets of sensor devices to convert the events data to scored data model values that serve as indicators of whether particular tasks are capable of being performed without delay,
receive, from the one or more sets of sensor devices, the scored data model values that serve as indicators of whether the particular tasks are capable of being performed without delay; and
wherein the one or more instructions, that cause the one or more processors to generate the set of priority values, cause the one or more processors to:
generate the set of priority values based on the scored data model values.

18. The non-transitory computer-readable medium of claim 15, wherein the one or more instructions, that cause the one or more processors to perform the one or more actions associated with assisting in the performance of the task, cause the one or more processors to:
  identify one or more custom tools to assist in performing the task,
    wherein the one or more custom tools include at least one of:
      contact information for a group of employees working at a site that is involved in performance of the task,
      particular application status metrics for the site, or
      a templated script identifying recommended ways to perform the task, and
  provide the one or more custom tools for display on the interface of the user device to make the one or more custom tools accessible while the task is being performed.

19. The non-transitory computer-readable medium of claim 15, wherein the one or more instructions, that cause the one or more processors to provide the recommendation to the user device, cause the one or more processors to:
  provide the recommendation for display on the interface of the user device,
    wherein the interface is to display an object identifying the task that is to be performed and one or more feedback objects that allow a user of the user device to agree or disagree with the recommendation;
  wherein the one or more instructions, when executed by the one or more processors, further cause the one or more processors to:
    receive, from the user device, feedback data indicating whether the user agreed or disagreed with the recommendation; and
    retrain the data model using the feedback data.

20. The non-transitory computer-readable medium of claim 15, wherein the one or more instructions, that cause the one or more processors to provide the recommendation to the user device, cause the one or more processors to:
  identify one or more custom tools to assist in performing the task; and
  provide the one or more custom tools for display on the interface of the user device to make the one or more custom tools accessible while the task is being performed.

* * * * *